US006926022B2

(12) United States Patent
Dornfeld

(10) Patent No.: US 6,926,022 B2
(45) Date of Patent: Aug. 9, 2005

(54) CONDENSATE REMOVAL SYSTEM

(75) Inventor: Richard L. Dornfeld, Aurora, IL (US)

(73) Assignee: McNish Corporation, Aurora, IL (US)

( * ) Notice: Subject to any disclaimer, the term of this patent is extended or adjusted under 35 U.S.C. 154(b) by 3 days.

(21) Appl. No.: 10/685,275

(22) Filed: Oct. 13, 2003

(65) Prior Publication Data
US 2005/0076952 A1 Apr. 14, 2005

(51) Int. Cl.[7] .............................................. G05D 9/00
(52) U.S. Cl. .......................... 137/1; 137/172; 137/577; 210/538
(58) Field of Search ............................ 137/1, 172, 577; 210/538

(56) References Cited
U.S. PATENT DOCUMENTS 1,488,597 A * 4/1924 Gleason ................. 137/247.21
2,089,141 A * 8/1937 Wasserman ............ 137/247.19

OTHER PUBLICATIONS

Walker Process Equipment, Planograph #9-99-9/70 (80" PD Gear) Side 1, Sep. 1970.
Walker Process Equipment, Planograph #9-99-3/76 (80" PD Split Gear) Side 1, Mar. 1976.
Walker Process Equipment, Planograph #9-99-3/76 (80" PD Split Gear) Side 2, Double Pinion, Mar. 1976.
Walker Process Equipment, Planograph #9-98-9/70 (60" PD Gear) Side 1, Sep. 1970.
Walker Process Equipment, Planograph #9-98-5/77 (60" PD Split Gear) Side 1, May 1977.
Walker Process Equipment, Planograph #9-98-5/77 (60" PD Split Gear) Side 2, Double Pinion, May 1977.
Walker Process Equipment, Planograph #9-89-9/70 (42" PD Gear) Side 1, Sep. 1970.
Walker Process Equipment, Planograph #9-89-10/76 (42" PD Split Gear) Side 1.
Walker Process Equipment, DRG 4S34079-1, Condensate Removal System, 42" P.D. Spur Gear Drive—Rev. 1975.
Walker Process Equipment, DRG 4S34080-1, Condensate Removal System, 60" P.D. Spur Gear Drive—Rev. 1975.
Walker Process Equipment, DRG 4S34081-1, Condensate Removal System, 80" P.D. Spur Gear Drive—Rev. 1975.
Walker Process Equipment, DRG 4S34082-1, Condensate Removal System, 100" P.D. Spur Gear Drive—Rev. 1975.
Walker Process Equipment, DRG. 2S34078-0, Operation Instructions Condensate Removal System—1972.
Walker Process Equipment, Circa 1979 DWG 4S44872-3, 100" PD Gear.
Walker Process Equipment, DWG 4S43118-0, Circa 1977.
Walker Process Equipment, DWG 4S43144-2, Circa 1977.
Walker Process Equipment, DWG 1S43145-0, Circa 1977.

(Continued)

Primary Examiner—Gerald A. Michalsky
(74) Attorney, Agent, or Firm—Barnes & Thornburg LLP

(57) ABSTRACT

A condensate removal system for removing condensate or infiltrate from a fluid reservoir containing a lubricating or sealing fluid. The condensate removal system includes a fluid conduit having a discharge leg with an outlet port. The condensate removal system prevents or inhibits evaporation of fluid within the discharge leg through the outlet port of the discharge leg while allowing fluid within the discharge leg to flow through the outlet port. The location of the outlet port of the discharge leg is adjustable to compensate for different specific gravities of the lubricating or sealing fluid.

19 Claims, 16 Drawing Sheets

OTHER PUBLICATIONS

Walker Process Equipment, DWG 4S44922-3, Circa 1977.
Walker Process Equipment, DWG 4S44923-3, Circa 1977.
Walker Process Equipment, DWG 4S44927-3, Circa 1977.
Walker Process Equipment, DWG 4L11743-0 D80N19 Spur Gear Drive Assembly Condensate Removal System, Jun. 2001.
Walker Process Equipment, DWG 4L11744-0 S80N Spur Gear Drive Assembly Condensate Removal System, Jun. 2001.
Walker Process Equipment, 3L11745-0 80" Spur Gear Housing Condensate Removal System, Jun. 2001.
Walker Porcess Equipment, 3L11746-0 80" Pinion Pocket Condensate Removal System, Jun. 2001.
Walker Process Equipment, 4L11559-0 D80N19 Spur Gear Drive Assembly, Apr. 2001.
Walker Process Equipment, 4L11557-0 D80N Spur Gear Drive Assembly, Apr. 2001.
Walker Process Equipment, 4L11574-0 S80N Spur Gear Drive Assembly Condensate Removal System, Apr. 2001.
Walker Process Equipment, 3L11581-0 Spur Gear Housing Condensate Removal System, Apr. 2001.
Walker Process Equipment, 3L11582-0 Pinion Pocket Condensate Removal System, Apr. 2001.
Walker Process Equipment, 4L11573-1 8ON19 Spur Gear Drive Assembly, Apr. 2001.
Walker Process Equipment, P30701R DRG 3C REV 0 80" Spur Gear Housing Condensate Removal system, Jun. 2001.
Walker Process Equipment, P30701R DRG 3D REV 0 80" Pinion Pocket Condensate Removal System, Jun. 2001.
Walker Process Equipment, P30701R DRG 4D REV 0 Spur Gear Housing Condensate Removal System, Apr. 2001.
Walker Process Equipment, P30701R DRG 4E REV 0 Pinion Pocket Condensate Removal System, Apr. 2001.
Walker Process Equipment, Circa 1997, M70381, DRG. 2 REV 1.
Walker Process Equipment, Circa 1997 M70942 DRG 2 REV 2 Sectional Elevation 85'-0" DIA RSP-S Collector.
Walker Process Equipment, P00331 DRG 2 REV 1, General Plan 50'-0 DIA. C Thickener, Circa 2000.
Walker Process Equipment, P00331 DRG 13-3 REV 0, Upper Torque Tube—14", 41" Worm Gear, Circa 2000.
Walker Process Equipment, P00331 DRG 40-1 REV 0, Cover Plate, Circa 2000.
Walker Process Equipment, P00332 DRG 2 REV 1, Sectional Elevation, 50'-0 DIA, Fixed Cover, Circa 2000.
Keen Corp., Specification Data Circular Clarifier Half-Bridge Type HBS or HB, pp. 1-001 & 2, Jun. 1971.
Keen Corp., Parts List 42 Drive.
Keen Corp., Parts List 60 Drive.
Amwell, DRG D70527795171 Parts List Model 28H6 Drive, 1987.
Amwell, DRG D70523093171 Parts List Model 42H8 Drive, 1987.
Amwell, DRG D70513321171 Parts List Model 42S10 Drive, 1987.
Amwell, DRG D70527261171 Parts List for No. 6F Full Bridge Drive with Shear Pin Hub, 1987.
Amwell, DRG D70527076171 Parts List for No. 8F Clarifier Drive with Shear Pin Hub, 1987.
Amwell, DRG D70526343171 Parts List for No. 10F Clarifier Drive with Shear Pin Hub, 1987.
Equipment Competitor Analysis, Component Clarifier/Thickener.

DBS Manufacturing, DBS Industrial Drive Units Brochures REV. May 1986.
DBS Manufacturing, DBS Industrial Drive Units, pp. 1, 2, 4, 6, 8, 10, 17 and Front and Rear—Jul. 1992.
DBS Manufacturing, Operation & Maintenance Manual DE2- 42-7 Feb. 9, 1990.
DBS Manufacturing, Operation & Maintenance Manual DE2- 42-7 Jan. 31, 1992.
DBS Manufacturing Submittal Letter of Sep. 11, 1997.
DBS Manufacturing, DWG #D4S309C8, 1997.
DBS Manufacturing Operation & Maintenance Manual DE2- 42-7 Jan. 31, 1991.
DBS Manufacturing Drive Unit Technical Information, pp. 1, 8, 10 and Rear Cover Sheet.
DBS Manufacturing, DBS in Motion Brochure.
DBS Manufacturing Website, Jan. 16, 2004, Technical Bulletin-Condensate Control in Clarifier and Thickener Drive Units by James Hu, PE.
Dorr-Oliver, Dorr Clarifiers Brochure—Revised 1957.
Dorr-Oliver, The Dorrco Distributor/Bulletin No. 6300—Revised 1959.
Dorr-Oliver, Dorr-Oliver Thickeners Brochures—Revised 1974.
Dorr-Oliver, Dorr-Oliver Thickening Equipment and Systems Brochure; Cover Page, pp. 18-22 and Rear Page—1981.
Eimco, DRG 103868 A, Model 54, Type HR & HRAW, 1965—Revised 1966.
Eimco, DRG 14306 C, Model 12, 18,24,30, 36L & 36H, Type HR & HRAW, 1967—Revised 1969.
Eimco, DRG 14035 C, Model 8, Type HR & HRAW, 1967—Revised 1969.
Eimco, DRG 103809 B, Model 48H, Type HR & HRAW, 1967—Revised 1969.
Envirotech, Rotary Distributors from Eimco Brochure-1972.
DBS Manufacturing, Operation & Maintenance Manual DE-42H-10-S, Dec. 2, 1997.
Eimco, DRG 110188 A, Drive Unit B 22/W18 Combination, 1967 Revised 1968.
Eimco, DRG 46342 A, Drive Unit Size W12, 1967 Revised 1968.
Eimco, DRG 46765, Drive Unit Size B22, 1968.
Eimco, DRG 46825, Drive Unit W18, 1969.
Eimco, DRG 115786 B, W212P Drive Unit, 1990 Revised NA.
Eimco, DRG 115791 C, W24P Drive Unit, 1990 Revised 1990.
Eimco, DRG 115197 E, Drive C30LT and C30HT, 1982 Revised 1988.
Eimco, DRG 115658 C, Drive C60HT, 1986 Revised 1988.
Eimco, DRG 25239D1 B, C60HT Drive Conversion, 1996 Revised 1996.
Eimco, DRG 111737 I, C-30 Drive (Basic), 1970.
Eimco, DRG 115660 K, C60HT Drive, 1986 Revised 1994.
Eimco, DRG 25369D51 A, General Erection C60HT Drive Conversion, Revised 1996.
Eimco, Clarifier Driveheads Require Good, Sound Designs, Not Designs That Sound Good Brochure, Circa 1980s.
Eimco, Clarifying Drives: How to Design & Manufacture (or Specify) the Perfect Sedimentation Drive Brochure-1992.
Eimco, Drive Lubrication Brochure, pp. 29 and 30- Jul. 1996.

Rex Chainbelt Inc, DRG. 315.8.502, p. 2 of 2, Assembly Details—Type FS, Issued Mar. 1972.
Rex Chainbelt Inc, DRG. 315.8.514, p. 2 of 2, Assembly Details—Type HS Side Feed, Issued Mar. 1972.
Rex Chainbelt Inc., DRG. 315.8.516, p. 2 of 2, Assembly Details—Type CHS Siphon Feed, Issued Mar. 1972.
Rex Chainbelt Inc, DRG. 315.8.524, p. 2 of 2, Assembly Details—Type SHS Siphon Feed, Issued Mar. 1972.
Envirex, DRG 315-11-531, 1 of 1, General Arrangement—Drive Unit-Series "F7"—Full Bridge Issued Oct. 1982.
Envirex, DRG 315-11-533, 1 of 1, General Arrangement—Drive Unit—Series "F18"—Full Bridge Issued Oct. 1982.
Envirex, DRG 315-11-535, 1 of 1, General Arrangement—Drive Unit-Series "F30", "F60", "F100"—Full Bridge—Issued Oct. 1982.
Envirex, DRG 315-11-541, 1 of 1, General Arrangement—Drive Unit—Series "H40", "H60", "H80", "H90"—Half Bridge—Issued Oct. 1982.
Envirex Typical Specification 315-11.422, Half Bridge Design, p. 2 of 5, Issued Oct. 1989.
Chain Belt Company—Rex Circular Scraper Sludge Collector—1960, pp. 1 through 7.
Rex Chainbelt Inc.—Rex Circular Scraper Sludge Collector—1964, pp. 1 through 4.
Envirex A Rexnornd Company—Rex Circular Scraper Sludge Collector—1985, pp. 1 through 3.
Envirex—Rex Circular Clarifiers—Design and Application—REV. Aug. 1989.
U.S. Filter Envirex—Circular Clarification Equipment & Processes Brochure, Pages Front, 6, 7, 10, 11, 13, Rear Page-Sep. 1997.
Envirex "H" Drive Drawing—p. 5.201, Circa 1990's.
Envirex "CF" Drive Drawing- p. 5.202, Circa 1990's.
Envirex, Quotation No. 40681, Re: Jefferson, Iowa, Apr. 2, 2003 pp. 6 through 8 of 16.
Enviroquip, Inc., DRG No. 300000, Rotary Distributor, Feb. 26, 1980.
Enviroquip, Inc., Circular Collector Drives, Specification, Internal Spur Gear, Effective Date Sep. 25, 1980.
Enviroquip, Inc., Circular Collector Drives Specification, 42.0 Inch P.D., Circa 1980.
Enviroquip, Inc., Circular Collector Drives, 60.0 Inch P.D., Circa 1980.
Enviroquip, Inc., Circular Collector Drives, 80.0 Inch P.D., 1980.
Enviroquip, Inc., 35" P.D. Spur Gear, Lubrication Points Brochure, May 24, 1995.
Enviroquip, Inc., Special Instructions for Rotating Machinery Brochure, p. 4, Sep. 6, 1995.
Enviroquip, Inc., 35" P.D. Drive Assembly, Sheet 1 of 1, Jun. 6, 1996.
Enviroquip, Inc., Drive Mechanism Brochure, Circa 1998.
Flender Corp., DRG SK01140 Clarifier Drive, 1984.
Flender Corp., DRG 5534114 Assembly Drawing, 1984.
General Filter, A-21087 "88" Clarifier Drive Assembly Dual Pinion Drawing.
General Filter, A-21813 "88" Clarifier Drive Assembly Single Pinion Drawing.
Hi-Tech Environmental, Inc., DRG D-771-041, 30SBC-8 and 30SBD-8 Drive Unit General Assembly—1992.
Hi-Tech Environmental, Inc., Maintenance Instructions-Automatic Condensate Overflow-30", 42" 60" Turntable Drives.
Hi-Tech Environmental, Inc., Maintenance Instructions-Turntable Drive Unit Grease Requirements-30", 42" 60" Turntable Drives.
Hi-Tech Environmental, Inc., Drives for Municipal and Industrial Applications Brochure.
Hi-Tech Enviromental, Inc., Clarifier/Thickener Drive Units—2003.
National Hydro Systems, Inc., DRG D-14095 File 67, Assembly—Clarifier Drive Model HS 66, Mar. 15, 1977.
National Hydro Systems, Inc., DRG D-19036 File 67, Drive Assembly—Model FS30-8-D, Sep. 7, 1979.
National Hydro Systems, Inc., DRG D-19158 File 67, Drive Assembly—Model HS37.5-8-D, Sep. 25, 1979.
National Hydro Systems, Inc., DRG D-19034 File 67, Drive Assembly—Model FS30-6-D, Oct. 1, 1979.
National Hydro Systems, Inc., DRG D-13555 File 67, Drive Assembly—Model HS37.5-6-D, Oct. 12, 1979.
National Hydro Systems, Inc., DRG D-13541 File 67, Drive Assembly—Model HS48-8-D, Dec. 7, 1979.
National Hydro Systems, Inc., DRG D-13502 File 67, Drive Assembly—Model HS48-9.25-D Dec. 13, 1979.
National Hydro Systems, Inc., DRG-D 13528 File 67, Drive Assembly—Model HS66-9.25-D, Aug. 1, 1984.
National Hydro Systems, Inc., DRG D-31601 File 67, Drive Assembly—Model HS13-10-D, Feb. 21, 1986.
National Hydro Systems, Inc., DRG D-32071 File 67, Drive Assembly—Model HS87-11.5DS, Jul. 14, 1986.
Peabody Welles, Clarification Equipment Brochure, Front Page, p. 13, Rear Page, 1972.
Peabody Welles, Bill of Material No. 471-141.
Peabody Welles, DRG 471-141, Internal Pinion Gear Ass'y.
Peabody Welles, Spur Gear Drives Brochure Circa 1979.
Westech Engineering Inc., DRG. D3501006, Feb. 1989 (Grease Lubricated).
Westech Engineering Inc., Catalog Description (Grease Lubricated Bearing & Oil Lubricated Gear).
Westech Engineering Inc., Page from Website, Grease Lubricated Drives.
Westech Engineering Inc., DRG DV805001, Drive Unit General Arrangement, Mar. 1993.
Westech Engineering Inc., DRG DV804201, Drive Unit General Arrangement, Mar. 1993.
Westech Engineering Inc., DRG 350G380, Cage Drive Assembly—Elevation—Retrofit Intermediate, Jul. 12, 1999.
Westech Engineering Inc., Operation and Maintenance Manual, OM0013.wpd, Aug. 18, 1998.
Westech Engineering Inc., Operation and Maintenance Manual, OM0021.wpd, Aug. 18, 1998.
Westech Engineering Inc., Operation and Maintenance Manual, OM0058.wpd, Aug. 18, 1998.
Westech Engineering Inc., Operation and Maintenance Manual, OM0040wpd, Apr. 26, 1999.

* cited by examiner

CONDENSATE REMOVAL SYSTEM

BACKGROUND OF THE INVENTION

In many applications an enclosure or housing contains a primary liquid lubricant or sealing fluid. An example of a housing containing a primary liquid lubricant is an internal spur gear drive. An example of a housing containing a primary sealing fluid is the liquid seal for a clarifier or digester cover having a movable section, a fixed section, and a liquid seal assembly to prevent the free passage of gases from one side of the cover to the other. These housings are generally enclosed to exclude rain and contaminants, but they cannot be completely sealed against the ingress of humid air or the infiltration of liquid water, due to the nature of the movable components.

The introduction of liquid water arising from condensation of water vapor, or the ingress of liquid water, into liquid seal assemblies and liquid lubricant sumps has long been a problem. If the primary fluid, such as a sealing fluid or lubricant, has a specific gravity lower than that of water, the water displaces the primary fluid.

In a lubrication application, as would be found in internal spur gear drives, condensation and infiltrated water accumulating within reservoirs or sumps, displaces the primary fluid, which is usually a petroleum based lubricating oil, exposing bearing, gearing, and other surfaces to water, disrupting lubrication films and causing increased potential for corrosion. The accumulation of water in the drive housing can displace the primary fluid to the point of expulsion from the housing creating spillage.

In water and wastewater treatment plants, including municipal and industrial plants, the local relative humidity is increased by water vapor that is present above process basins, tanks, or vats. The housings of gear drives and liquid seal housings may be exposed to direct sunlight during part or all of the day or the housing may be exposed to other varying heat sources or cycles. As the housing is heated, the internal air within the housing is also heated and expands. The increased internal pressure expels a portion of the air from within the housing to outside of the housing. When the heating cycle ends, such as due to a change in a process or a shifting of sunlight away from the housing, the housing cools and the internal air contracts. The volumetric contraction of the cooler air lowers the internal pressure within the housing, drawing in ambient exterior air, which is sometimes laden with moisture. As this air cools within the housing, the dew point of the water vapor is reached and the vapor condenses forming beads of liquid condensate within the housing. The condensate is drawn by gravity to the low points within the housing, which in many cases is through the lubricant, where it accumulates below the lubricant, due to the specific gravity difference of the fluids. Water that has infiltrated the housing from the outside will also tend to accumulate below the lubricant or sealing fluid.

Within the housing, the condensate located below the lubricant does not evaporate as the heat input is generally less than the required latent heat of evaporation, and a lubricant such as oil, which has a lower specific gravity than water, forms a layer over the water condensate, thereby creating a vapor seal above the liquid water. Similar but more severe conditions exist when the housing is located within a cover that extends over a basin of liquid, such as water, wastewater or other process fluid, as the cover confines vapor in the vicinity of the drive housing.

A sewage treatment clarifier may be covered as an odor control measure. A liquid seal is employed in those cases where a portion of the cover must be free to move or rotate about the center of the basin. The seal is normally made up of an annular chamber having sides and a bottom. This chamber contains the primary fluid, usually petroleum oil or silicone oil. A cylindrical wall extends into the annular chamber and is partially submerged into the primary fluid. The cylindrical wall is connected to the movable cover section while the annular chamber is connected to another cover section, or the positions can be reversed. If the primary fluid is petroleum oil, the accumulation of water in the annular chamber can displace the petroleum oil to the point of oil spillage over the top of the chamber walls.

If the primary fluid has a specific gravity greater than water, as does silicone oil, the water remains above the primary fluid. Again, the water can accumulate to overflow the chamber walls. Before this, however, the water retained above the primary fluid can become a breeding place for flies, mosquitoes, and the like. A layer of petroleum oil can be poured over the silicone primary fluid to seal the water surface from the breeding insects, but again water can accumulate to overflow the chamber walls carrying the petroleum oil before it, leaving the water surface exposed.

Manual and continuous operating or automatic condensate systems have been developed to drain condensate and infiltrate from the housing. The manual system drains the condensate periodically by means of a manual valve or a motorized valve and switch arrangement. The continuous system drains the condensate as it appears or "automatically".

Condensate removal systems previously used and as currently in use are generally V or U-shaped devices consisting of a collection leg and a discharge leg, and in some cases a transverse leg. A primary or first fluid, such as oil, and a secondary fluid, such as water, of different densities or specific gravities are contained within the V or U-shaped devices. The secondary fluid constitutes the liquid condensate, liquid infiltrate, or liquid condensate and liquid infiltrate combined, all hereinafter referred to collectively as "condensate". Liquid water condensate has a specific gravity of approximately 1.00. Liquid water condensate collects in a sump within the housing and is drained into the collection leg of the removal system. The primary fluid, such as oil, is intentionally placed within the housing to act as a lubricant, as a sealing fluid, and/or as a corrosion inhibitor among other functions. The primary fluid, such as oil, usually has a specific gravity less than that of the secondary fluid or condensate, such as water. The elevation of the interface surface between the primary fluid and the secondary fluid is thereby established by setting the elevation at which the secondary fluid in the discharge leg of the removal system is allowed to discharge, and by the volume of the primary fluid in the housing which determines the elevation of the oil and water interface in the collection leg.

Condensate removal system designs attempt to adjust the discharge elevation of the discharge leg during initial installation to accommodate primary fluids with a narrow range of specific gravities. These designs, however, result in the fixing of the discharge elevation at the time of installation without provision for additional adjustment during the service life of the equipment.

If, in the case of a gear housing, a primary fluid, such as a lubricant, is used that is outside of this range of initial installation parameters, the system may not operate properly. This has been one of the causes of operational problems in preceding condensate removal systems. The condensate removal system may be rendered inoperable due to a replacement of the first fluid by a third fluid of a lower or higher density or specific gravity than that of the first fluid, which causes the elevation of the interface of the third fluid and the second fluid in the collection leg to move outside of the design range.

If the specific gravity of the third fluid is higher than that of the first fluid, the elevation of the interface between the third fluid and the second fluid in the collection system is lowered relative to the elevation of the interface of the first fluid and the second fluid. When the fluid interface between the second fluid and the third fluid reaches the level of the connection between the collection and discharge legs, the third fluid is no longer sequestered in the collection leg portion of the V or U-shaped device and will flow to the discharge leg, resulting in a loss of the third fluid, such as lubricating oil, from the housing reservoir. The addition of make-up third fluid to raise the third fluid free surface to design levels only forces more third fluid from the reservoir and collection leg, while potentially ejecting it from the discharge point.

During normal seasonal lubricant replacement, the primary fluid may be replaced with a third fluid of lesser density or specific gravity than that of the primary fluid. The elevation of the interface between the third fluid and the second fluid within the collection leg rises relative to the elevation of the interface of the first fluid and the second fluid. When the fluid interface reaches the level of critical surfaces, such as bearing races and rolling elements or gear teeth, lubrication breaks down and lubricant starvation results. Corrosion also accelerates under these conditions. Additionally, the free surface of the third fluid may be raised resulting in the lubricant being expelled from the housing through seals not normally exposed to the original primary fluid. These situations have not been addressed in the industry.

Another common cause of failure in continuous condensate removal systems that has not previously been addressed is the loss of liquid condensate from the collection leg due to evaporation of condensate from the discharge leg through the discharge port without adequate replacement of liquid condensate to the system by the accumulation of condensate within the housing reservoir. This may seem in conflict with the desired result, which is the removal of condensate from the system. However, the height of the column of condensate within the collection leg must be maintained at a relatively constant elevation. When condensate within the housing arrives at the collection leg an equivalent volume of condensate is discharged through the discharge port of the discharge leg maintaining the system in balance.

When condensate evaporates from the discharge leg, and an equivalent volume of condensate is not collected within the housing, the lost volume is not replaced. The elevation of the fluid interface in the collection leg will be lowered. Addition of lubricant based on fill port levels, dipstick measurements, or sight glass levels will only further lower the lubricant-water interface in the collection leg. Continued unbalanced evaporation of condensate from the discharge leg can cause a transfer of the lubricant from the collection leg to the discharge leg. The lubricant or primary fluid will migrate to the top of any condensate remaining in the discharge leg. This results in lubricant discharge from an otherwise functional system, thus upsetting the balance of the system further.

The lubricant that is drained into the discharge leg is no longer available to the drive mechanism through the collection leg. If condensate forms within the drive housing it will migrate to the collection leg. The lubricant that has migrated to the discharge leg is then raised to the discharge port and discharged. When the primary and secondary fluid interface in the collection leg rises above its design elevation, gear teeth, bearings or other components are potentially exposed to the condensate, and the volume of the lubricant present to lubricate components or to act as a seal is reduced resulting in decreased drive system reliability.

SUMMARY OF THE INVENTION

A condensate removal system for removing condensate such as liquid water from a fluid reservoir of a housing including a primary fluid such as a lubricant or sealing fluid. The condensate system includes a fluid conduit having a discharge leg with a first end and a second end. The first end is adapted to be connected in fluid communication with the fluid reservoir. The second end of the discharge leg includes an outlet port adapted to be placed in fluid communication with the atmosphere. The discharge leg may include a segment having a reduced cross-sectional area to inhibit evaporation of fluid within the discharge leg through the outlet port. The discharge leg may include a seal mechanism including a seat and a seal member wherein the seal member is adapted to engage the seat and create a seal therewith to inhibit evaporation of fluid within the discharge leg through the outlet port. The seal member is adapted to disengage from the seat to allow fluid within the discharge leg to flow through the outlet port. The discharge leg may include a first segment including the first end of the discharge leg and a second segment including the outlet port. The second segment is slidably attached to the first segment such that the position of the outlet port can be selectively adjusted with respect to the first segment of the discharge leg.

BRIEF DESCRIPTION OF THE DRAWING FIGURES

DETAILED DESCRIPTION OF THE PREFERRED EMBODIMENTS

Figure 1:
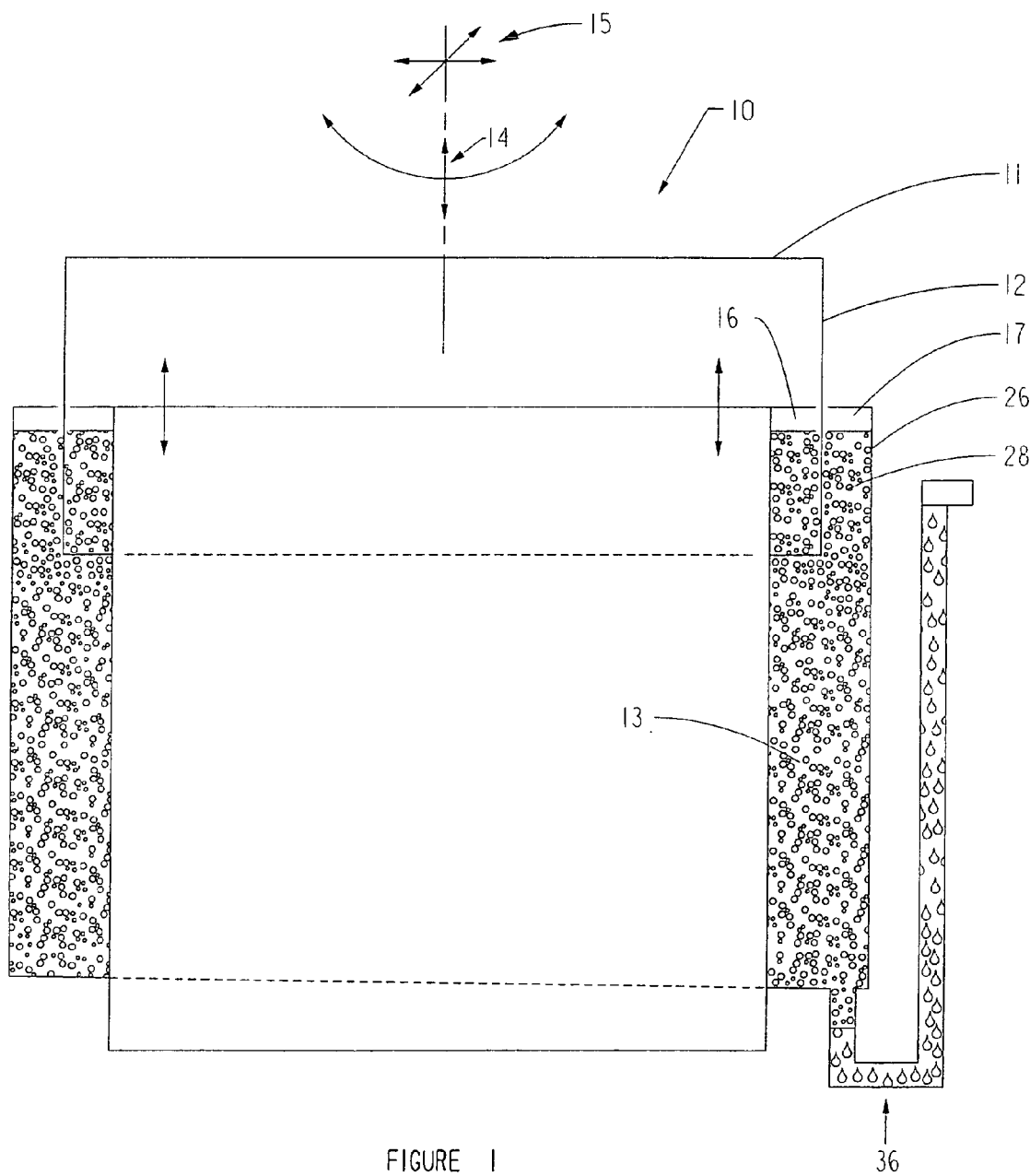
FIG. 1 shows a prior art condensate removal system in connection with a liquid seal.
Figure 2:
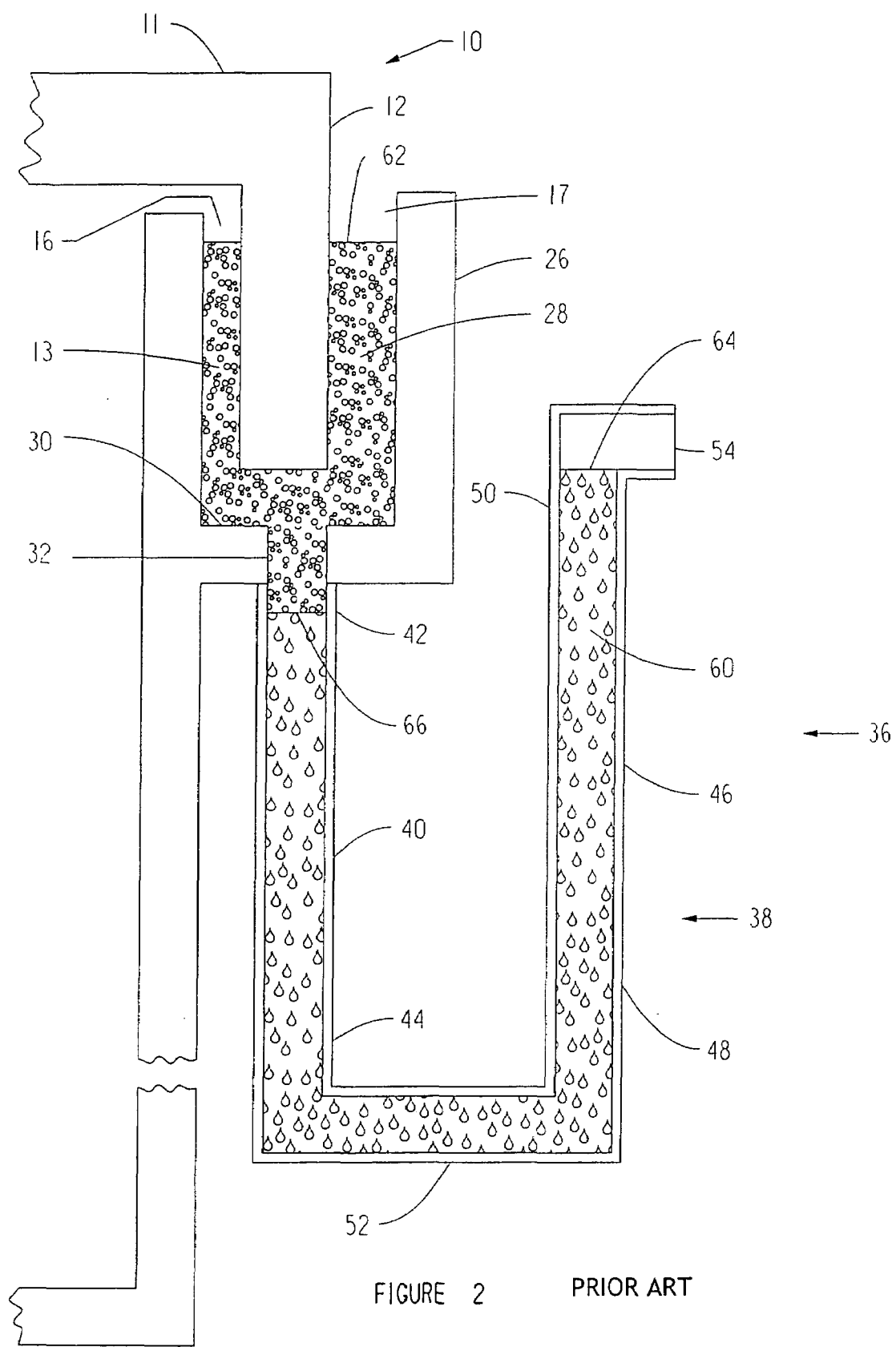
FIG. 2 is a side cross-sectional view of the condensate removal system of FIG. 1.

FIGS. 1 and 2 show a seal mechanism 10 including a top 11 and a side skirt 12. The bottom end of the skirt 12 is immersed in a primary fluid 28 retained in a fluid reservoir 13 of a housing 26. The skirt 12 is adapted to seal the interior of a hollow closed interior chamber 16 while allowing rotation, translation, or oscillation about a vertical axis 14 and translation about any horizontal axis 15 that is perpendicular to the axis 14. At least a portion of the skirt 12 is located within the housing 26 and is immersed in the first fluid 28 of the seal mechanism 10. The housing 26 communicates with the hollow closed chamber 16 and with an open external chamber 17. The housing 26 is adapted to contain the primary or first fluid 28. The housing 26 includes a sump 30 which is adapted to collect fluid within the fluid reservoir 13 and direct it to a port 32 in the housing 26. The first fluid 28 may be a liquid such as petroleum or mineral oil. A condensate removal system 36 is in communication with port 32 of the housing 26 and the atmosphere.

Figure 3:
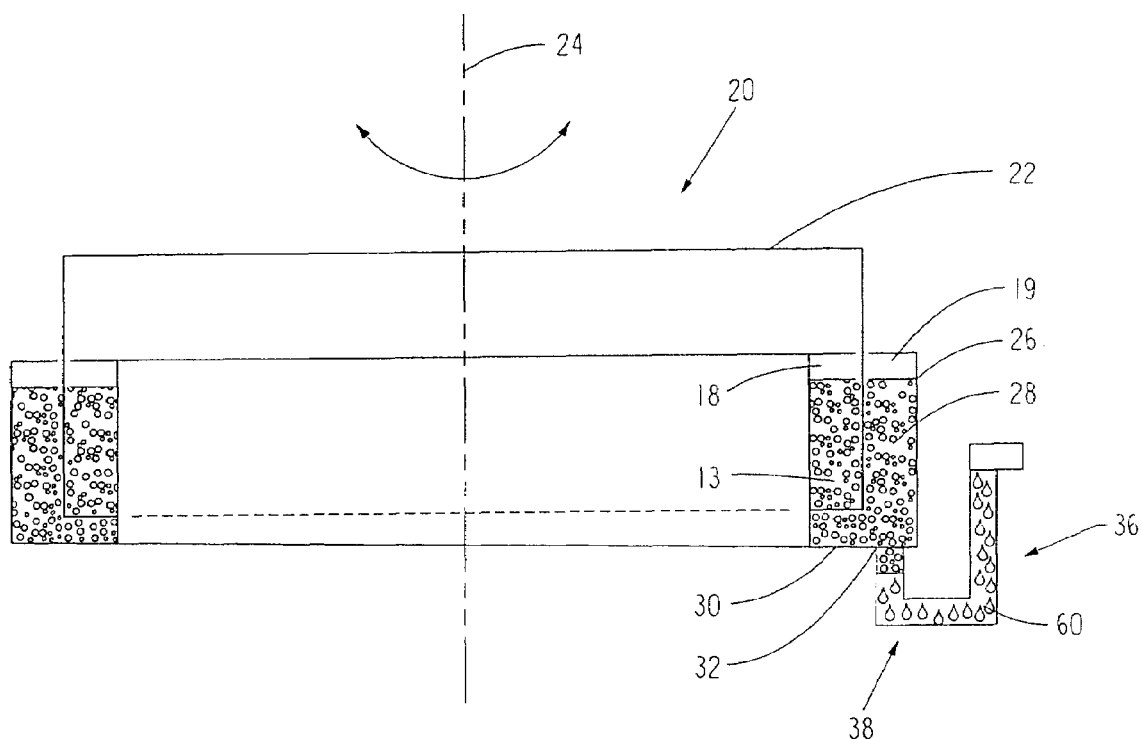
FIG. 3 shows a prior art condensate removal system in connection with a drive mechanism.
Figure 4:
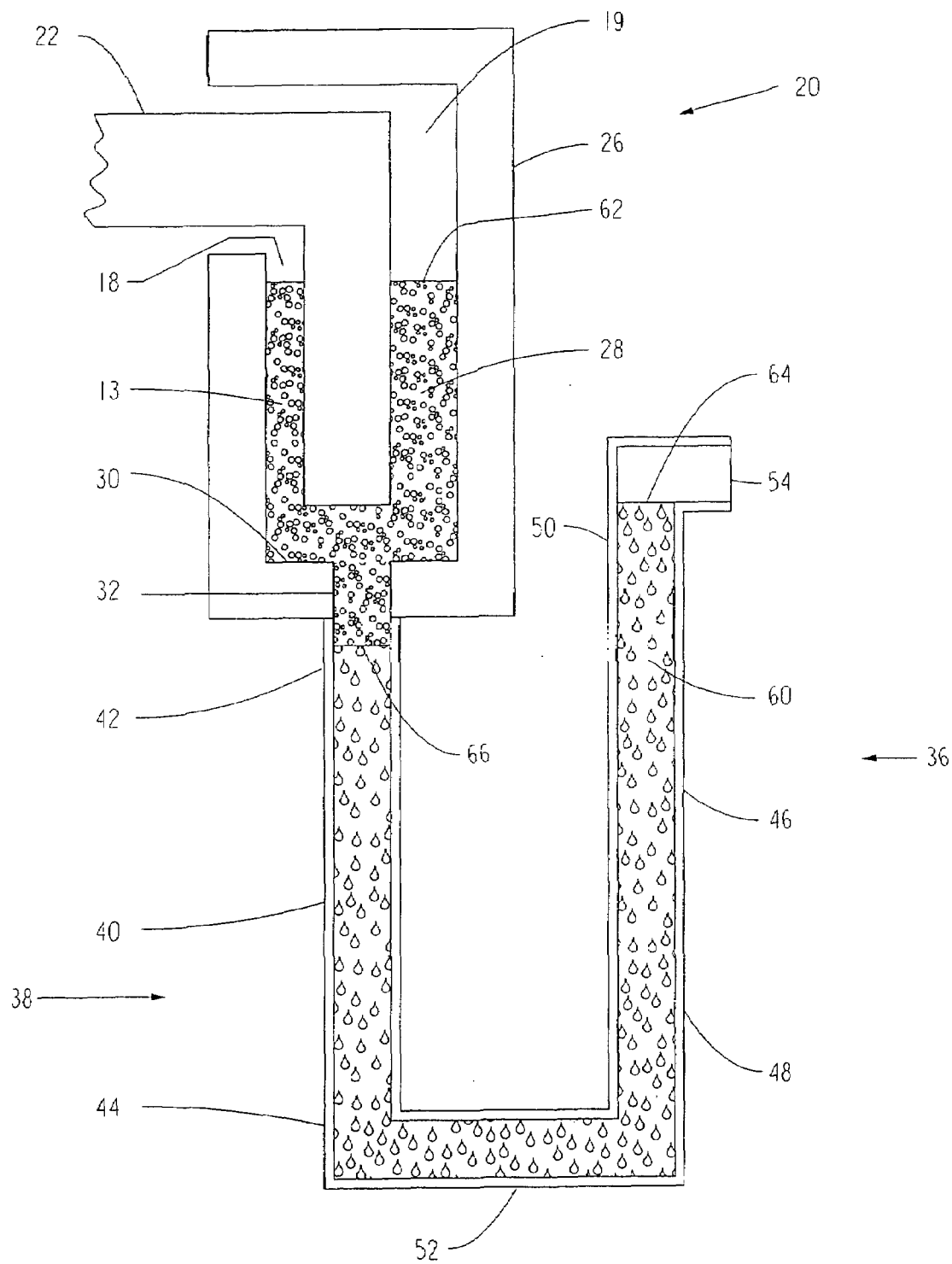
FIG. 4 is a side cross-sectional view of the condensate removal system of FIG. 3.

FIGS. 3 and 4 show a drive mechanism 20 including a gear 22, such as a spur gear, worm gear or the like, in connection with a housing 26. The gear 22 is adapted to rotate about a vertical axis 24. At least a portion of the gear is located within the fluid reservoir 13 of a housing 26. The housing 26 and gear 22 form an open internal chamber 18 and an open external chamber 19, both of which communicate with the atmosphere. A condensate removal system 36 is in communication with the fluid reservoir 13 of the housing 26 and with the atmosphere.

As shown in FIGS. 1–4 the prior art condensate removal system 36 includes a generally U-shaped tubular conduit 38 having a collection leg 40, a discharge leg 46, and a connecting leg 52. The collection leg 40 includes a first end 42 and a second end 44. The first end 42 of the collection leg 40 is adapted to be attached to the housing 26 in fluid communication with the port 32. The discharge leg 46 includes a first end 48 and a second end 50. The connecting leg 52 is attached at one end to the second end 44 of the collection leg 40 and at a second end to the first end 48 of the discharge leg 46. The second end 50 of the discharge leg 46 includes an outlet port 54. Each of the legs 40, 46, and 52 include a respective hollow bore in fluid communication with one another such that the inlet port 32 is in fluid communication with the outlet port 54. The collection leg 40 and discharge leg 46 are generally vertical and parallel to one other. The U-shaped conduit 38 is adapted to contain a second fluid 60 in each of the legs 40, 46 and 52. The second fluid 60 has a higher density or specific gravity than the density or specific gravity of the first fluid 28. For example, the second fluid 60 may typically comprise liquid water having a specific gravity of approximately 1.00, while a lubricant that comprises the first fluid 28 may typically have a specific gravity between approximately 0.850 and 1.000. The first fluid 28 will in this example therefore float on top of the second fluid 60.

The first fluid 28 has a top surface 62 located in the housing 26, and the second fluid 60 has a top surface 64 located at the outlet port 54 of the discharge leg 46. The first fluid 28 contacts the second fluid 60 within the collection leg 40 at a fluid interface 66. The top surface 64 of the second fluid 60 is located at the outlet port 54 at an elevation between the respective elevations of the fluid interface 66 and the top surface 62 of the first fluid 28. As water vapor contained in the air located in the housing chambers above the first fluid 28 condenses, the liquid condensate will flow downwardly through the first fluid 28 and will be collected in the sump 30. The condensate will then flow from the sump 30 through the port 32 and into the second fluid 60 contained in the collection leg 40. As a volume of condensate flows into leg 40, an equal volume of second fluid 60 in the discharge leg 46 will be discharged through the outlet port 54, such that the fluid interface 66 remains at a relatively constant elevation. The top surface 62 of the first fluid 28 thereby also remains at a relatively constant elevation.

Figure 5:
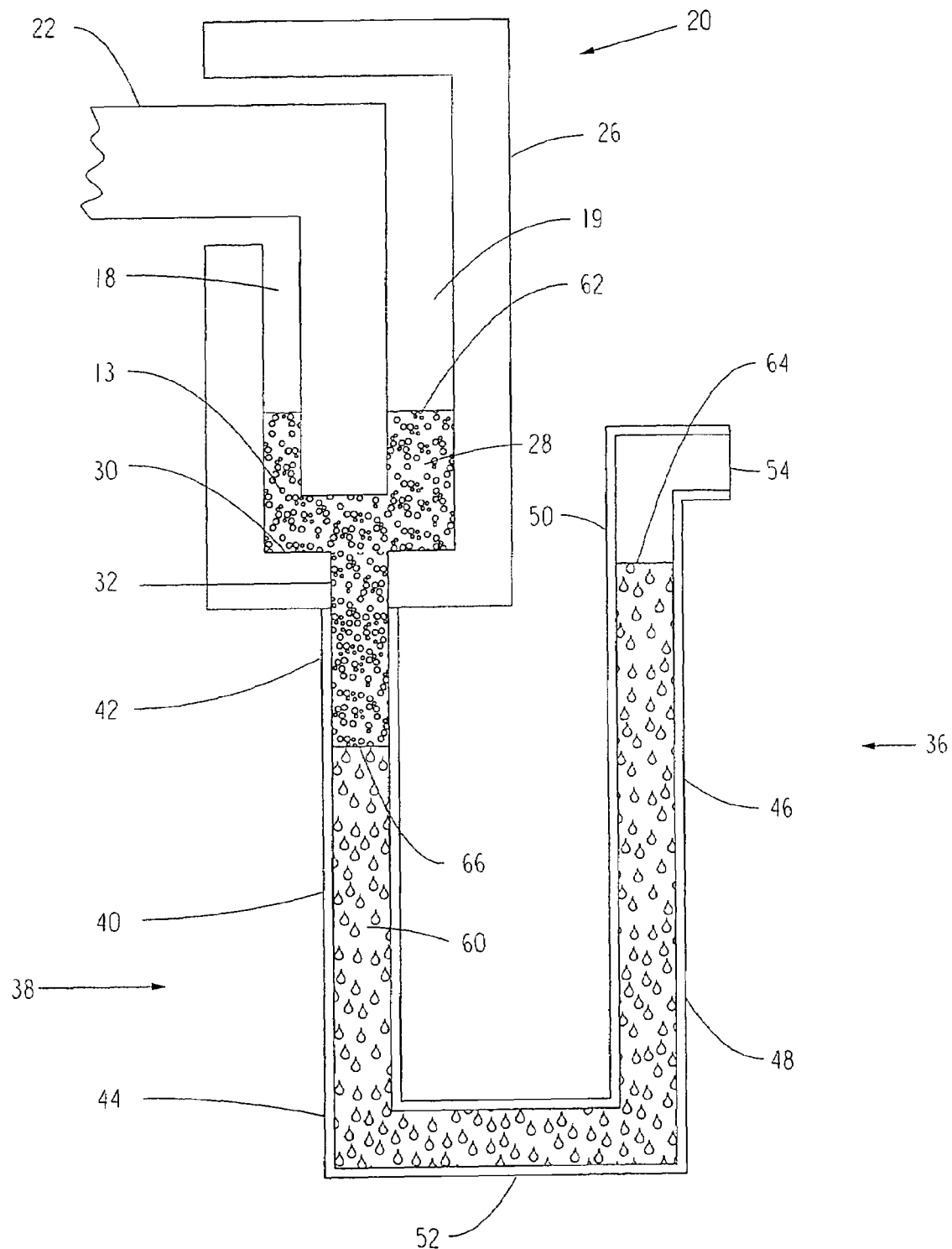
FIG. 5 is a side cross-sectional view of the condensate removal system of FIG. 4, but shown after evaporation of a portion of the condensate from the discharge leg through the discharge port.

FIG. 5 shows the condensate removal system 36 after a portion of the second fluid 60 in the discharge leg 46 evaporates through the outlet port 54 and is not replaced with a corresponding volume of condensate that is collected by the sump 30. As can be seen when compared to FIG. 4, the elevation of the top surface 62 of the first fluid 28, the elevation of the top surface 64 of the second fluid 60, and the elevation of the fluid interface 66 are all lower in FIG. 5 than in FIG. 4. The gear 22 as shown in FIG. 5 is, therefore, in contact with a lower elevation of first fluid 28 such that the gear 22 is not as well lubricated, as is the gear 22 shown in FIG. 4. The improper lubrication of the gear 22 as a result of the lower level of the first fluid 28 as shown in FIG. 5 can result in damage to the drive mechanism 20.

Figure 6:
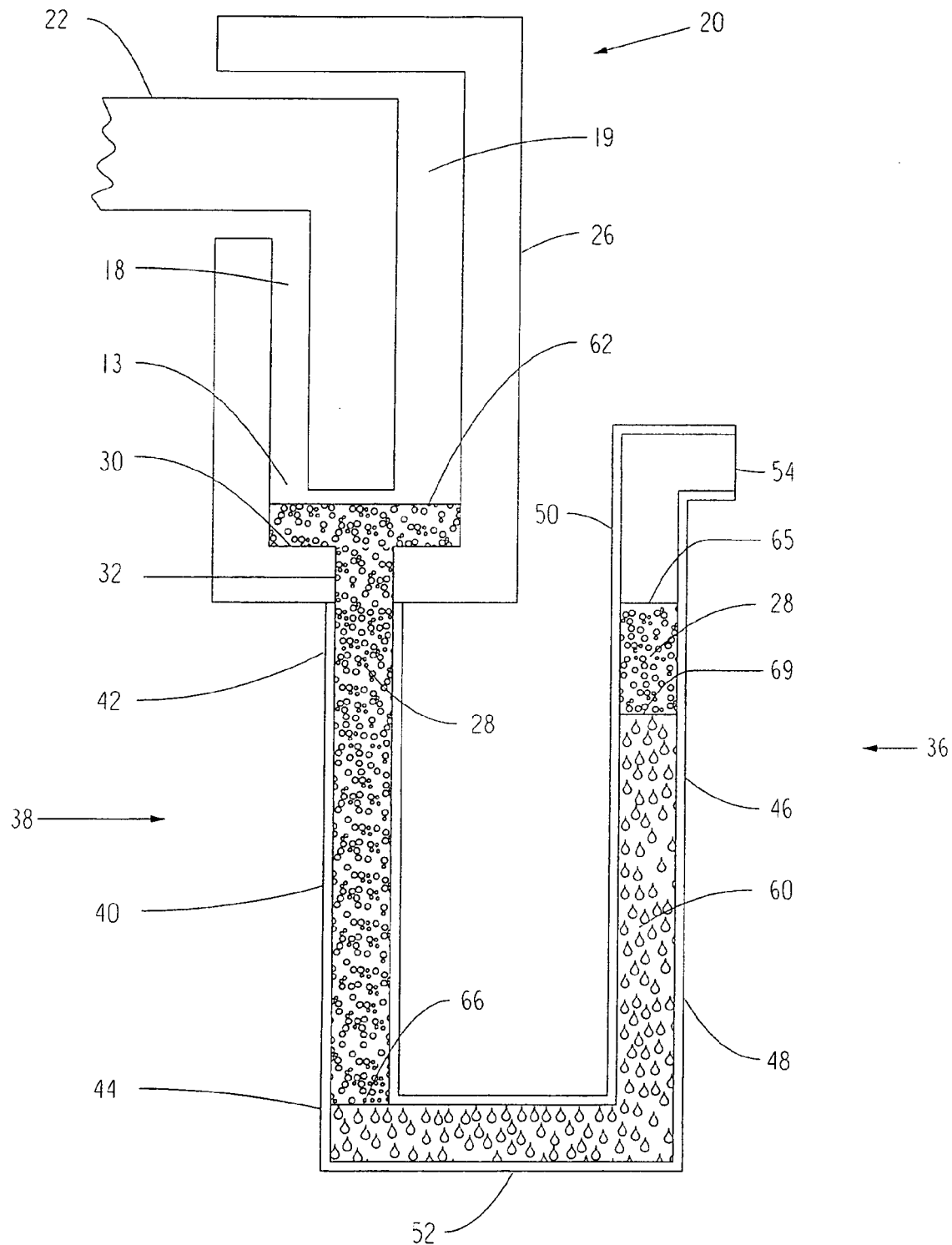
FIG. 6 is a side cross-sectional view of the condensate removal system of FIG. 5 shown after evaporation of a sufficient amount of condensate to sufficiently lower the first fluid-second fluid interface to allow the first fluid to be discharged from the discharge port.

As shown in FIG. 6, when a sufficient volume of second fluid 60 has evaporated from the discharge leg 46 through the outlet port 54, without a corresponding volume of condensate being collected by the sump 30 for introduction into the collection leg 40, the fluid interface 66 is further lowered to a position within the connecting leg 52. The first fluid 28 may thereby flow from the fluid reservoir 13 in housing 26 through the collection leg 40 and connecting leg 52 into the discharge leg 46. First fluid 28 then collects above the second fluid 60 in the discharge leg 46. The first fluid 28 may then be discharged through outlet port 54. As shown in FIG. 6, the top surface 62 of first fluid 28 is no longer in contact with the gear 22 resulting in potential damage to the drive mechanism 20. If additional first fluid 28 is added to the reservoir 13 in order to raise the level of the first fluid 28 to the original elevation, this additional first fluid 28 will also migrate to the discharge leg 46. If a large enough quantity of first fluid 28 is added to the reservoir 13 in an attempt to return the first fluid surface 62 to the operating level shown in FIG. 4, the top surface 65 of the first fluid 28 within discharge leg 46 will reach the level of discharge outlet port 54 and may potentially be discharged onto machinery, walkways or other surfaces, where it can create a hazard. Similarly, if condensate forms in chambers 18–19, or if water infiltrates into chambers 18–19, the first fluid 28 located above the second fluid 60 in the discharge leg 46 will rise and will be discharged through outlet port 54.

Figure 7:
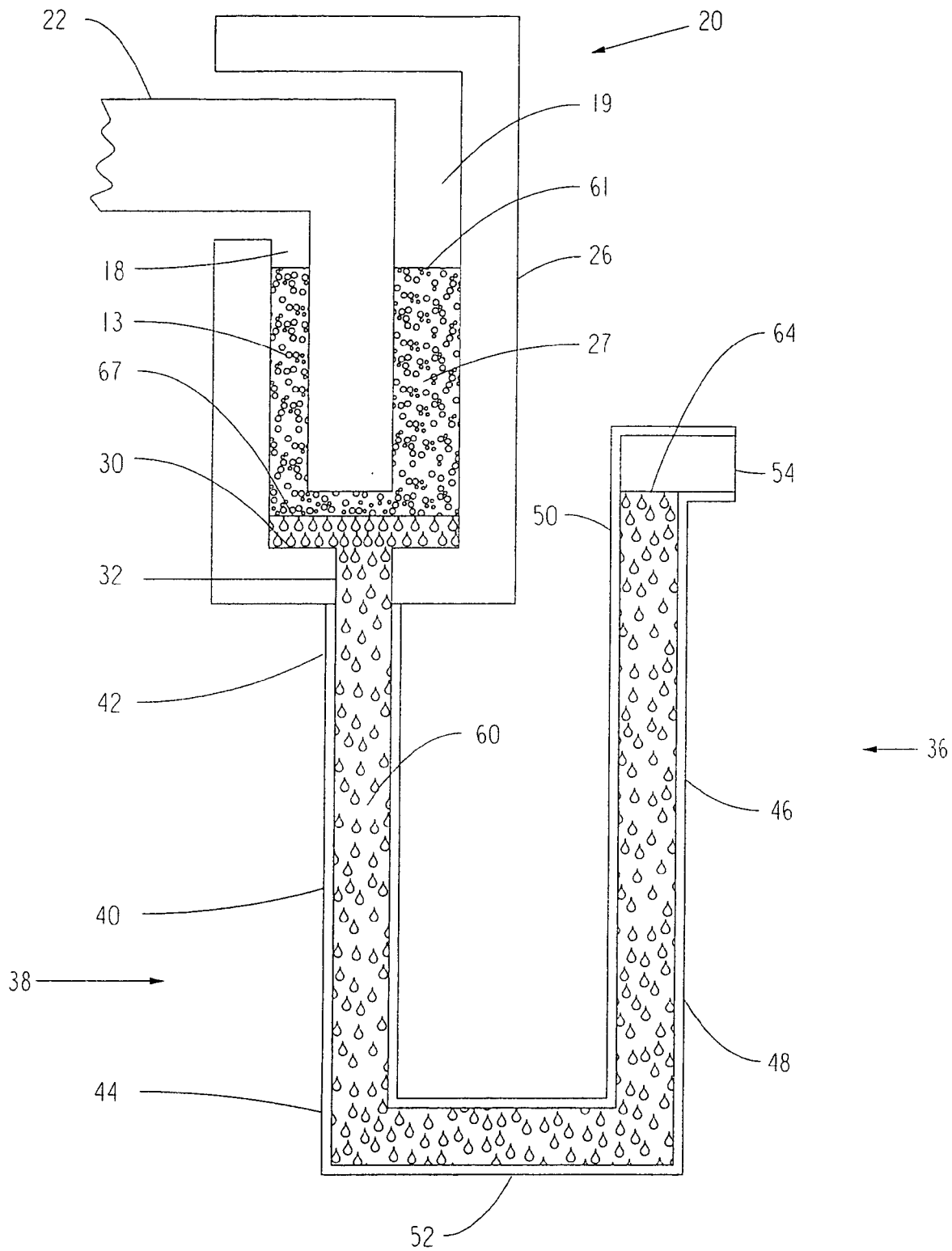
FIG. 7 shows a side cross-sectional view of the condensate removal system of FIG. 4 shown after the first fluid is replaced by a third fluid.

FIG. 7 shows the drive mechanism 20 wherein the first fluid 28 is replaced by a third fluid 27. The third fluid 27 may be a lubricating fluid. The third fluid 27 has a lower specific gravity than the first fluid 28. Replacement of the first fluid 28 with a third fluid 27 is common during seasonal lubricant replacement. The second fluid 60 and third fluid 27 have a fluid interface 67. The elevation of the fluid interface 67 between the second fluid 60 and third fluid 27 will be higher than the elevation of the fluid interface 66 between the first fluid 28 and second fluid 60 as shown in FIG. 4, while the elevation of the top surface 64 of the second fluid 60 in the discharge leg 46 will be unchanged, and the top surface 61 of the third fluid 27 will be at the same elevation as the top surface 62 of the first fluid 28 as shown in FIG. 4. The distance between the top surface 61 of the third fluid 27 and the fluid interface 67 of the third fluid 27 and second fluid 60 is less than the distance between the top surface 62 of the first fluid 28 and the interface 66 of the first fluid 28 and second fluid 60. This reduction in lubricant depth may expose portions of the gear 22, or other components, to the second fluid 60 rather than the third fluid 27, thus degrading lubrication and increasing the risk of corrosion.

Figure 8:
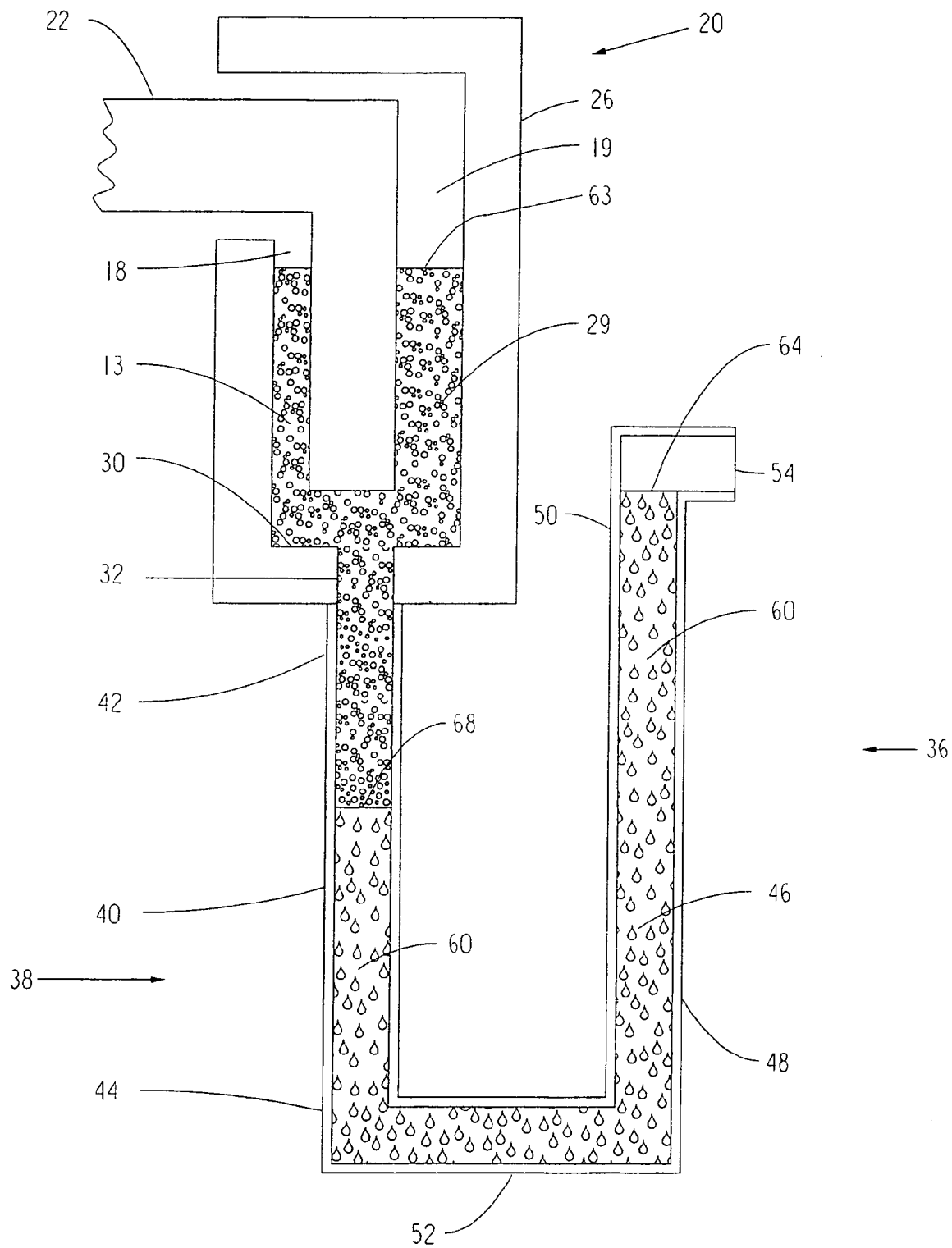
FIG. 8 shows a side cross-sectional view of the condensate removal system of FIG. 4 shown after the first fluid is replaced by a fourth fluid.

FIG. 8 shows the drive mechanism 20 in which first fluid 28 is replaced by a fourth fluid 29. The fourth fluid 29 may be a lubricating fluid. The fourth fluid 29 has a greater specific gravity than the first fluid 28. Replacement of the first fluid 28 with a fourth fluid 29 is common during seasonal lubricant replacement. Second fluid 60 and fourth fluid 29 will have a fluid interface 68. The elevation of the fluid interface 68 between the second fluid 60 and fourth fluid 29 is lower than the elevation of the fluid interface 66 between the first fluid 28 and second fluid 60 as shown in FIG. 4. The elevation of the top surface 64 of the second fluid 60 in the discharge leg 46 will be unchanged, and the top surface 63 of the fourth fluid 29 will be at the same elevation as the top surface 62 of the first fluid 28 shown in FIG. 4. The distance between the fourth fluid top surface 63 and the fluid interface 68 of the second fluid 60 and fourth fluid 29 is greater than the distance between the top surface 62 of the first fluid 28 and the fluid interface 66 of the first fluid 28 and second fluid 60 as shown in FIG. 4. As compared to the embodiment of FIG. 4, when a smaller volume of second fluid 60 evaporates from the discharge leg 46 through the outlet port 54, without a corresponding volume of condensate being collected by the sump 30 for introduction into the collection leg 40, the fluid interface 68 is further lowered to an elevation approaching the second end 44 of the leg 40 which is in communication with the connecting leg 52. The fourth fluid 29 may thereby flow from the fluid reservoir 13 through the collection leg 40 and connecting leg 52 into the discharge leg 46. The fourth fluid 29 may then be discharged through outlet port 54. Similar to what is shown in FIG. 6, the elevation of the top surface 63 of the fourth fluid 29 will be lowered and may no longer be in contact with the gear 22 resulting in potential damage to the drive mechanism 20. If additional fourth fluid 29 is added to the reservoir 13 in order to raise the level of the fourth fluid 29 to the original elevation, additional fourth fluid 29 will also migrate to the discharge leg 46. If a large enough quantity of fourth fluid 29 is added to the reservoir 13 the fourth fluid 29 will enter the discharge leg 46 and upon reaching the level of outlet port 54, may be discharged onto machinery, walkways or other surfaces where it can create a hazard in a manner similar to that as shown in FIG. 6. If evaporation of the second fluid 60 were to continue and no additional fourth fluid 29 were added to return the fourth fluid top surface 63 to the elevation of the top surface 62 of first fluid 28 as shown in FIG. 4, the level of the fourth fluid 29 could fall below the gear 22 resulting in unlubricated operation.

Figure 9:
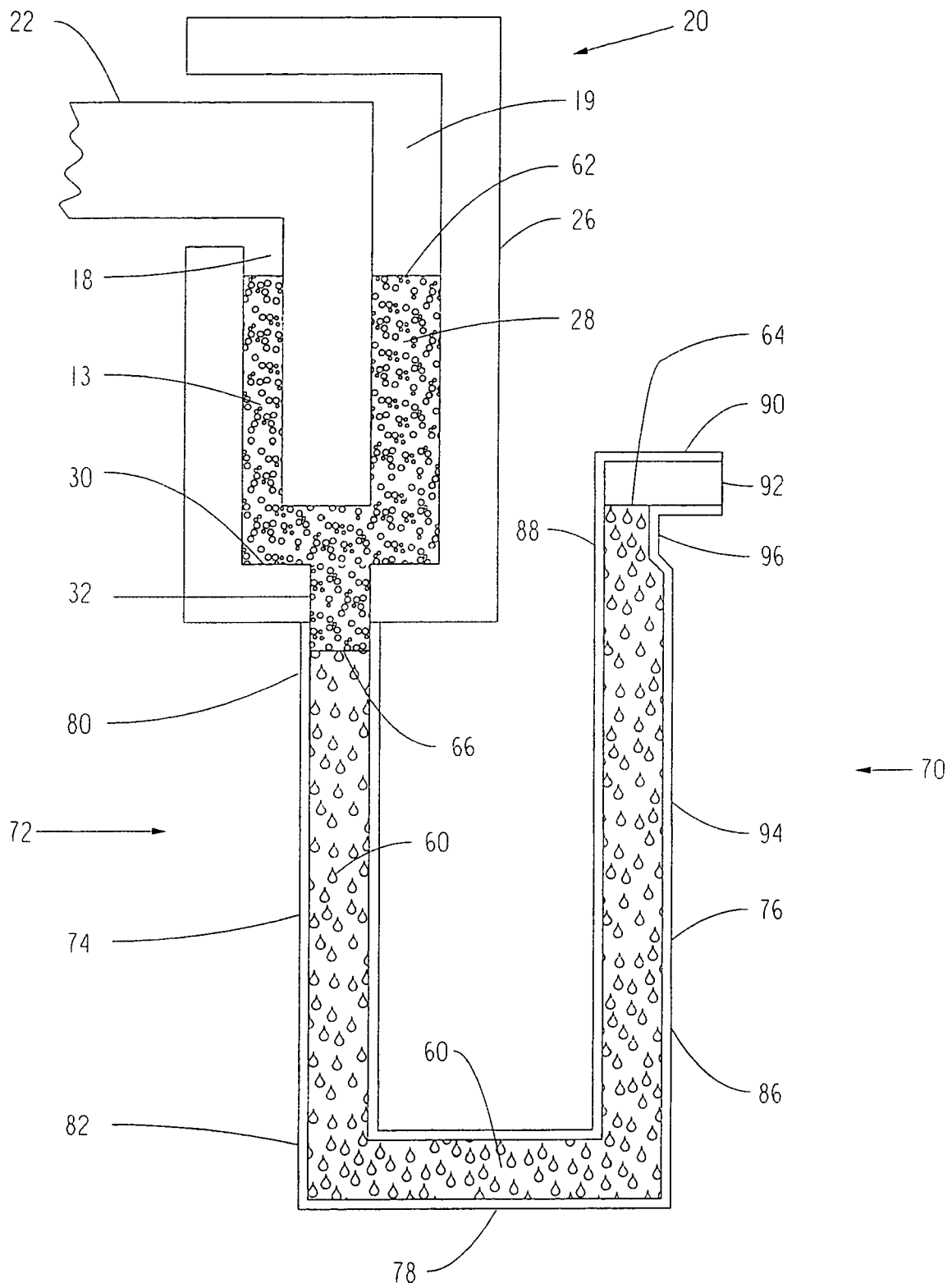
FIG. 9 shows a condensate removal system of the present invention having a discharge leg with reduced cross-sectional area at the discharge port.

FIG. 9 shows the condensate removal system 70 of the present invention in connection with the drive mechanism 20. The condensate removal system 70 includes a generally U-shaped tubular fluid conduit 72. The U-shaped conduit 72 includes a collection leg 74, a discharge leg 76, and a connecting leg 78. The collection leg 74 includes a first end 80 and a second end 82. The first end 80 of the collection leg 74 includes an inlet port adapted to be attached in fluid communication with the port 32 and reservoir 13 in the housing 26. The discharge leg 76 includes a first end 86 and a second end 88. The connecting leg 78 is attached at one end to the second end 82 of the collection leg 74 and at a second end to the first end 86 of the discharge leg 76. The second end 88 of the discharge leg 76 includes a spout 90 having an outlet port 92. Each of the legs 74, 76, and 78 include a respective hollow bore in fluid communication with one another such that the inlet port 32 is in fluid communication with the outlet port 92. The collection leg 74 and discharge leg 76 are generally vertical and parallel to one other.

The discharge leg 76 includes a lower segment 94 that is connected to the connecting leg 78 and an upper segment 96 that is attached to and extends between the lower segment 94 and the spout 90. The lower segment 94 includes a bore having a first diameter and a first cross-sectional area and the upper segment 96 includes a bore having a second diameter and a second cross-sectional area. The second diameter of the bore of the upper segment 96 is smaller than the first diameter of the bore of the lower segment 94. The second cross-sectional area of the upper segment 96 is smaller than the first cross-sectional area of the lower segment 94. The collection leg 74 includes a bore having a cross-sectional area that is approximately equal to the cross-sectional area of the bore of the lower segment 94 of the discharge leg 76. As shown in FIG. 9, the top surface 64 of the second fluid 60 is located within the upper segment 96 of discharge leg 76 such that the surface 64 has a reduced cross-sectional area in fluid communication with the atmosphere through the outlet port 92, as compared to the cross-sectional areas of the lower segment 94 and collection leg 74, to reduce the rate of evaporation of the second fluid 60 through the outlet port 92. A cross-sectional area reduction in the upper segment 96 from that of the lower segment 94 in the range of thirty-five percent to ninety-five percent is preferred, although a cross-sectional area reduction of as little as fifteen percent can have a beneficial result on the rate of evaporation. The relatively large diameter and cross-sectional area of the lower segment 94 allows the lower segment 94 to contain a relatively large volume of second fluid 60, than if it had the same cross-sectional area of the upper segment 96.

Figure 10:
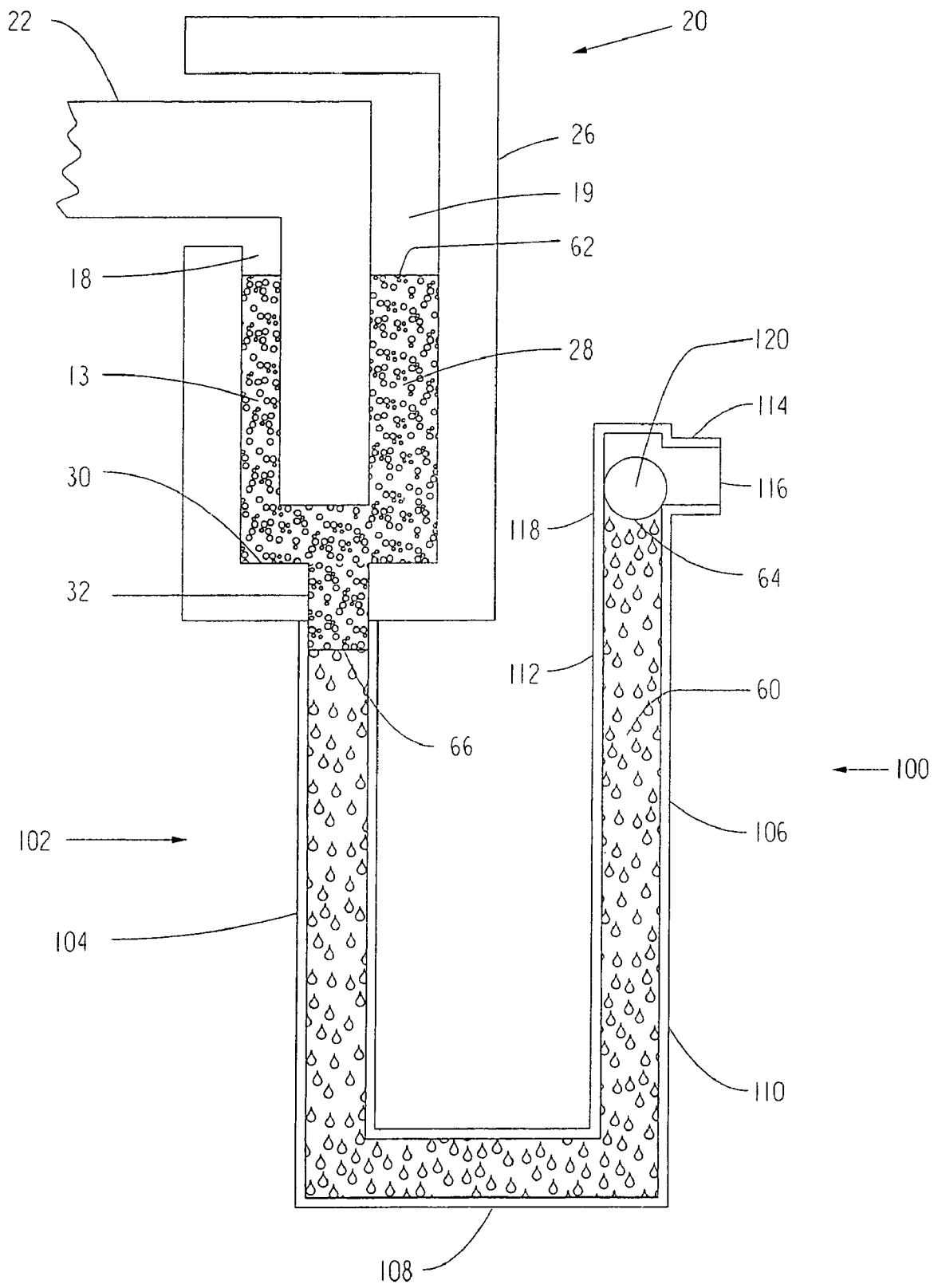
FIG. 10 is a side cross-sectional view of a modified embodiment of the condensate removal system of the present invention including a seal mechanism at the discharge end of the discharge leg.

FIG. 10 shows a modified embodiment of the condensate removal system designated with the reference number 100. The condensate removal system 100 includes a generally U-shaped fluid conduit 102 having a collection leg 104, a connecting leg 108 and a discharge leg 106. The connecting leg 108 connects the discharge leg 106 to the collection leg 104. The collection leg 104 is attached in fluid communication with the port 32 of the housing 26. The discharge leg 106 includes a first end 110 connected to the connecting leg 108 and a second end 112 including a spout 114 having an outlet port 116. The second end 112 of the discharge leg 106 also includes a seal mechanism including an annular peripheral seat 118 adapted to removably receive a seal member 120.

The seal member 120 is adapted to engage the seat 118 of the discharge leg 106 to create a fluid-tight seal between the bore within the discharge leg 106, that is located between the seat 118 and the first end 110, and the outlet port 116. As the second fluid 60 contained within the discharge leg 106 below the seat 118 is not in fluid communication with the atmosphere through the sealed seat 118, the second fluid 60 is prevented from evaporating and passing beyond the seat 118 and seal member 120 out the outlet port 116. The seal member 120 and the seat 118 thereby prevent evaporation of the second fluid 60 through the outlet port 116. However, the seal member 120 is adapted to break its seal with seat 118 when the second fluid 60 in the discharge leg 106 forces the seal member 120 upwardly out of engagement with the seat 118 such that a volume of second fluid 60 can be discharged from the discharge leg 106 through the outlet port 116, as second fluid 60 condenses within or infiltrates into the reservoir 13 and passes downwardly through the first fluid 28 and into the collection leg 104. A volume of second fluid 60 equal to the volume of the fluid that is collected in the collection leg 104 is thereby discharged through the seat 118 and the outlet port 116. The seal member 120 has a sufficiently large diameter such that it will not pass through the spout 114 or outlet port 116. The seal member 120 is preferably constructed as a spherical member or conical member to sealingly engage the seat 118.

Figure 11:
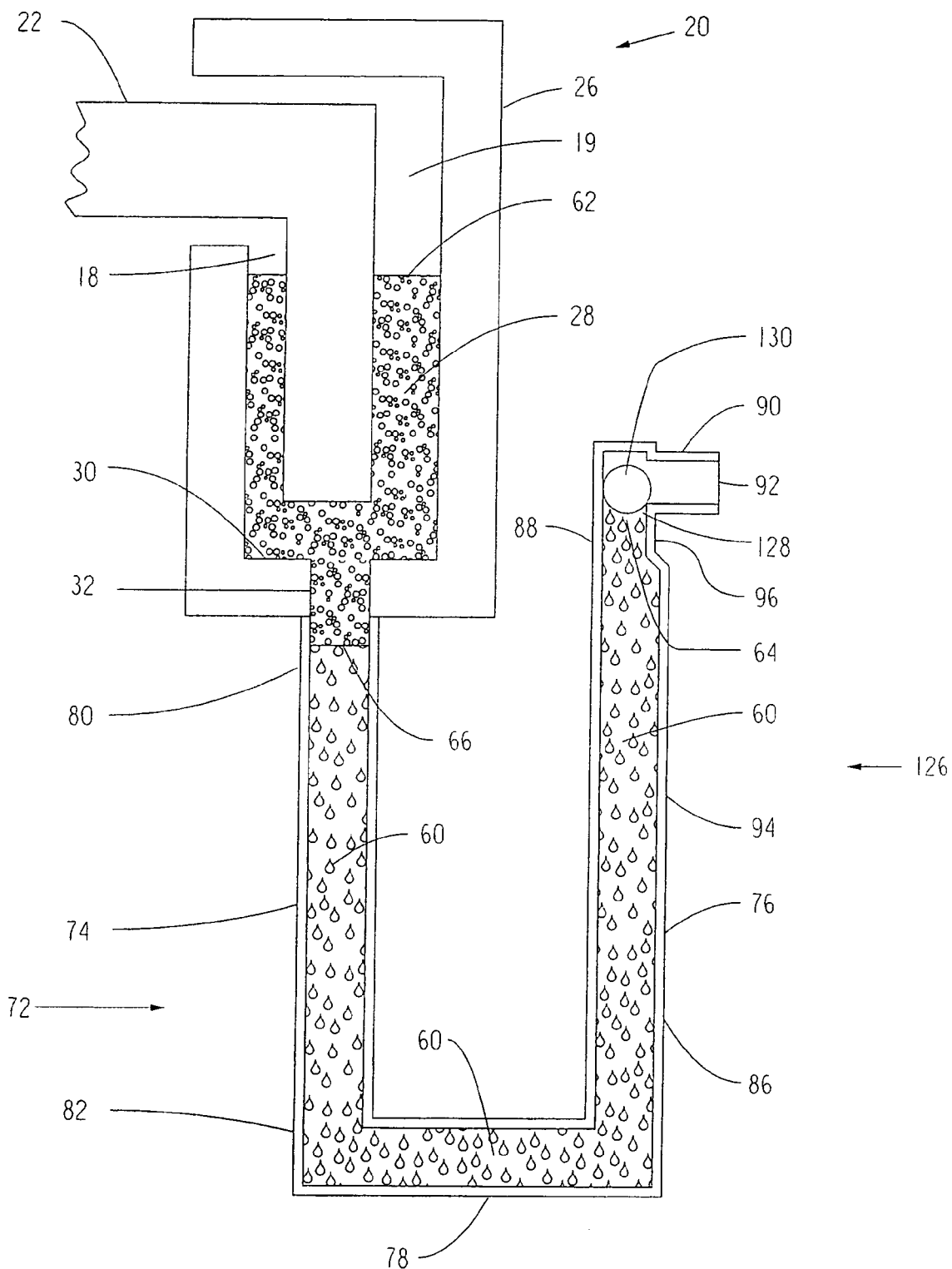
FIG. 11 is a side cross-sectional view of a further modified embodiment of the condensate removal system of the present invention including a reduced cross-sectional area and a seal mechanism at the discharge end of the discharge leg.

FIG. 11 shows a further modified embodiment of the condensate removal system of the present invention designated with reference number 126. The condensate removal system 126 is constructed substantially similar to the condensate removal system 70 as shown in FIG. 9 and similar elements are numbered with the same reference numbers. The discharge leg 76 of the condensate removal system 126 includes a seal mechanism having a seat 128 and a seal member 130. The seat 128 and seal member 130 are constructed and function in the same manner as the seat 118 and seal member 120. The condensate removal system 126 includes a reduced diameter upper segment 96 in the discharge leg 76, which provides a reduced cross-sectional area of the top surface 64 of the second fluid 60 to thereby reduce evaporation through the outlet port 92. The releasable seal member 130 is adapted to form a seal with the seat 128 to also prevent evaporation of the second fluid 60 through the outlet port 92.

Figure 12:
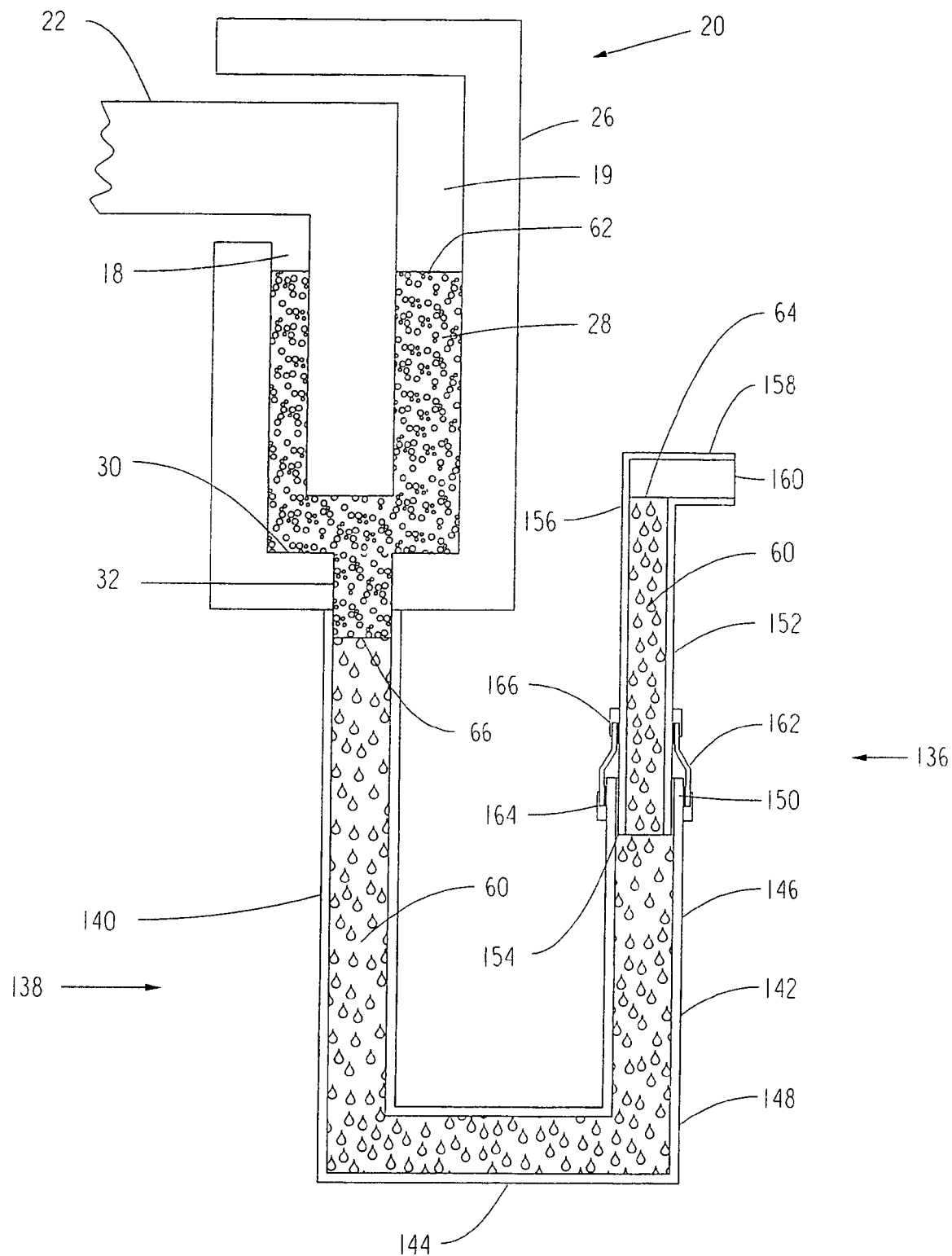
FIG. 12 is a side cross-sectional view of a further modified embodiment of the condensate removal system wherein the discharge leg includes a fixed segment and a vertically movable segment.

FIG. 12 shows a further modified embodiment of the condensate removal system of the present invention designated with reference number 136. The condensate removal system 136 includes a generally U-shaped fluid conduit 138 having a collection leg 140, a discharge leg 142 and a connecting leg 144 extending between the collection leg 140 and discharge leg 142. The discharge leg 142 includes a lower segment 146 having a first end 148 and a second end 150, and an upper segment 152 having a first end 154 and a second end 156. The second end 156 of the upper segment 152 includes a spout 158 having an outlet port 160. The lower segment 146 and the upper segment 152 are generally linear and tubular such that the upper segment 152 can slide coaxially with respect to the lower segment 146 within the bore of the lower segment 146 either downwardly, such that the first end 154 moves toward the first end 148 of the lower segment 146, or upwardly, such that the first end 154 of the upper segment 152 moves toward the second end 150 of the lower segment 146. The elevation of the outlet port 160 can thereby be selectively adjusted and set to a desired elevation to accommodate a replacement of the first fluid 28 by a third fluid 27 of lower specific gravity than the first fluid 28, or the replacement of the first fluid 28 by a fourth fluid 29 of greater specific gravity than the first fluid 28.

A sleeve seal member 162 seals the upper segment 152 to the lower segment 146. The sleeve seal member 162 has a first end 164 and a second end 166. The first end 164 of the sleeve seal member 162 extends around the second end 150 of the lower segment 146 and is stationarily attached thereto. The second end 166 of the sleeve seal member 162 extends around the outer circumference of the upper segment 152 and creates a fluid-tight sliding seal therewith. The sleeve member 162 seals the second end 150 of the lower segment 146 to the upper segment 152 to prevent leakage of fluid from between the lower segment 146 and the upper segment 152. The lower segment 146 has a bore with a first cross-sectional area and the upper segment 152 has a bore with a second cross-sectional area which is smaller than the first cross-sectional area of the lower segment 146. The area of the top surface 64 of the second fluid 60 at the second end 156 of the upper segment 152 adjacent the outlet port 160 is thereby smaller than the cross-sectional area of the lower segment 146 and of the collection leg 140 to reduce evaporation.

Figure 13:
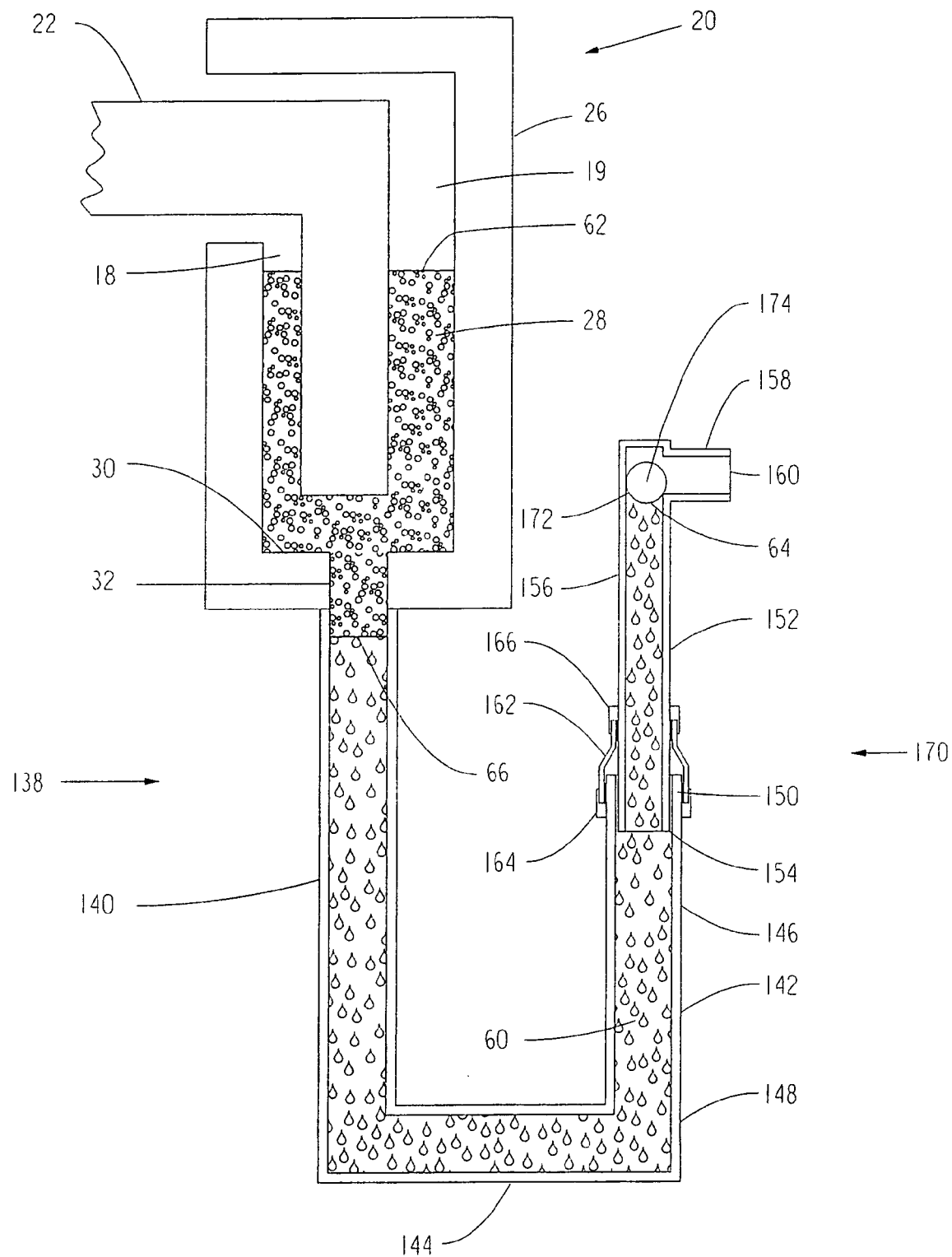
FIG. 13 is a side cross-sectional view of view of another modified embodiment of the condensate removal system wherein the discharge leg includes a fixed segment and a vertically movable segment having a sealing mechanism at the discharge end of the movable segment.

Another modified embodiment of the condensate removal system of the present invention is shown in FIG. 13 and is identified with reference number 170. The condensate removal system 170 is constructed substantially similar to the condensate removal system 136 as shown in FIG. 12 and like elements are numbered with the same reference numbers. The condensate removal system 170 includes a seal mechanism having a seat 172 and a seal member 174 at the second end 156 of the upper segment 152 of the discharge leg 142. The seat 172 and member seal 174 are constructed and function in the same manner as the seat 118 and seal member 120. The condensate removal system 170 thereby includes a reduced cross-sectional area upper segment 152 in which the top surface 64 of the second fluid 60 is located, to reduce evaporation of the second fluid 60 through the outlet port 160, and a seat member 172 and a seal member 174 adapted to selectively seal the second fluid 60 in the upper segment 152 from the outlet port 160 to also prevent evaporation of the second fluid 60 through outlet port 160.

Figure 15:
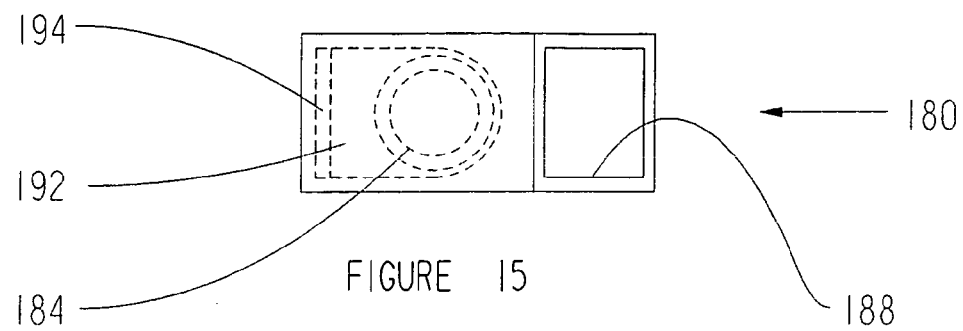
FIG. 15 is a top plan view taken along line 15—15 of FIG. 14.
Figure 14:
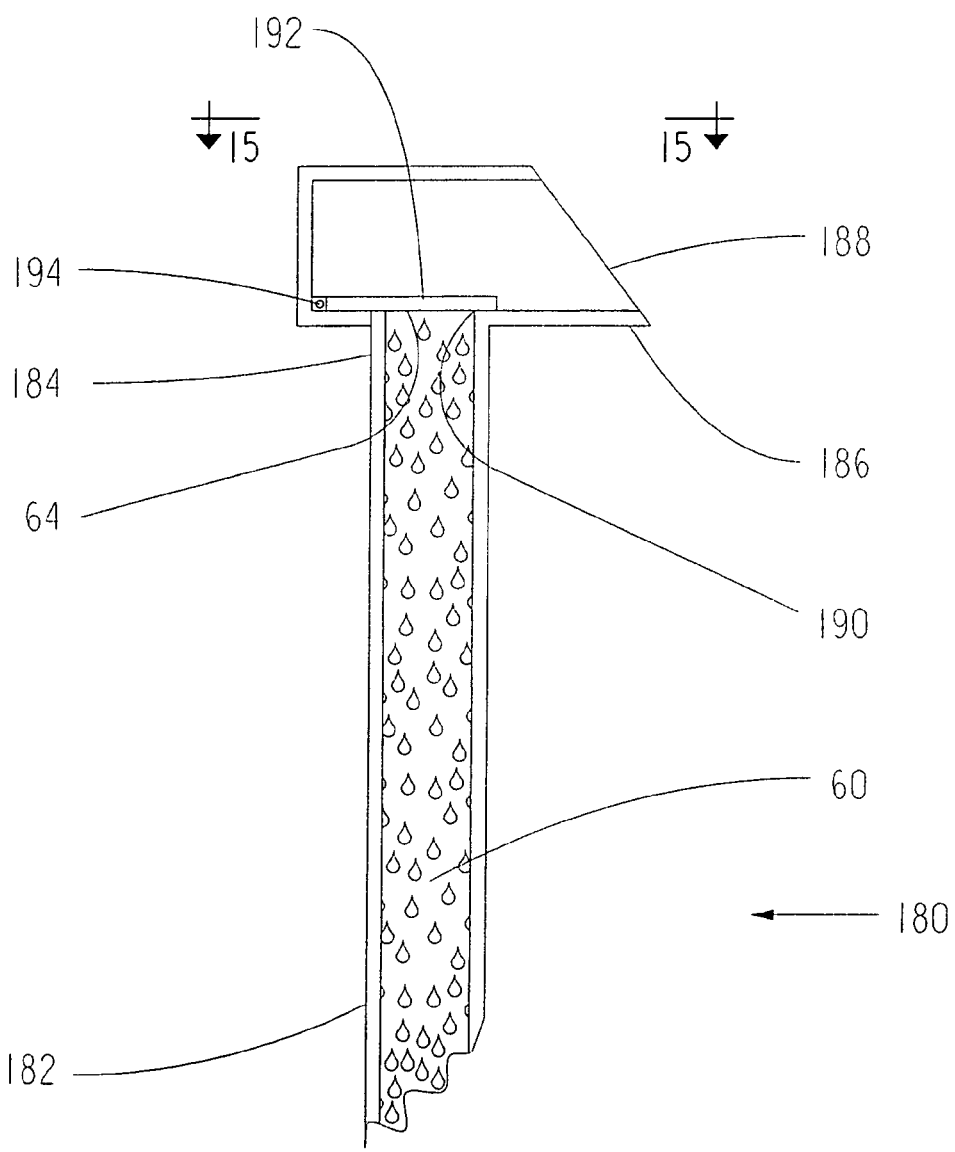
FIG. 14 is a partial side cross-sectional view of a discharge leg including a pivotal seal member.

FIGS. 14 and 15 show a modified embodiment of a discharge leg 180 of a condensate removal system. The discharge leg 180 includes a first end 182 and a second end 184. The second end 184 includes a spout 186 having an outlet port 188. The second end 184 of the discharge leg 180 also includes a seal mechanism having a seat 190 and seal member 192. The seal member 192 includes a substantially planar lower surface and is pivotally attached at an end 194 to the spout 186. The seal member 192 comprises a flap adapted to pivot upwardly away from the seat 190 to allow the second fluid 60 to pass through the seat 190 and to be discharged through the outlet port 188 in response to the collection of condensate within the collection leg of the condensate removal system. The seal member 192 is adapted to pivot downwardly to create a seal with the seat 190 to prevent the second fluid 60 within the discharge leg 180 from evaporating through the outlet port 188. If desired, the seal member 192 and seat 190 of FIG. 14 may be repositioned to the outer edge of the outlet port 188. The end 194 of the seal member 192 that is pivotally attached to the spout 86 would be repositioned to the top of the spout 186.

Figure 17:
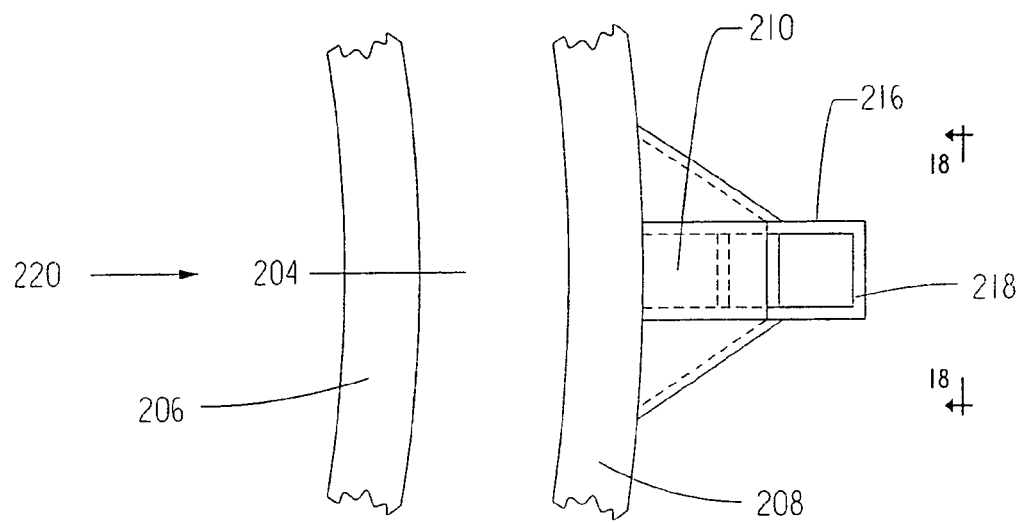
FIG. 17 is a top plan view taken along line 17—17 of FIG. 16.
Figure 16:
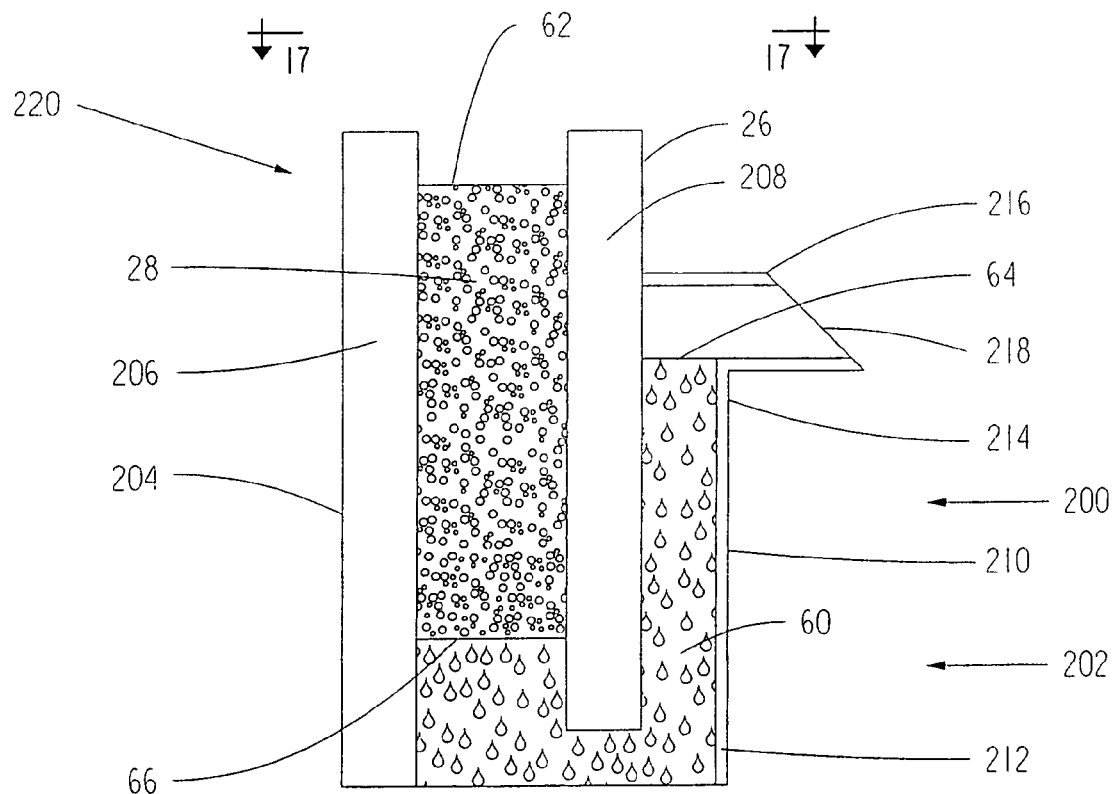
FIG. 16 is a partial cross-sectional view showing a condensate removal system of the present invention having a discharge leg formed integrally with the housing.
Figure 18:
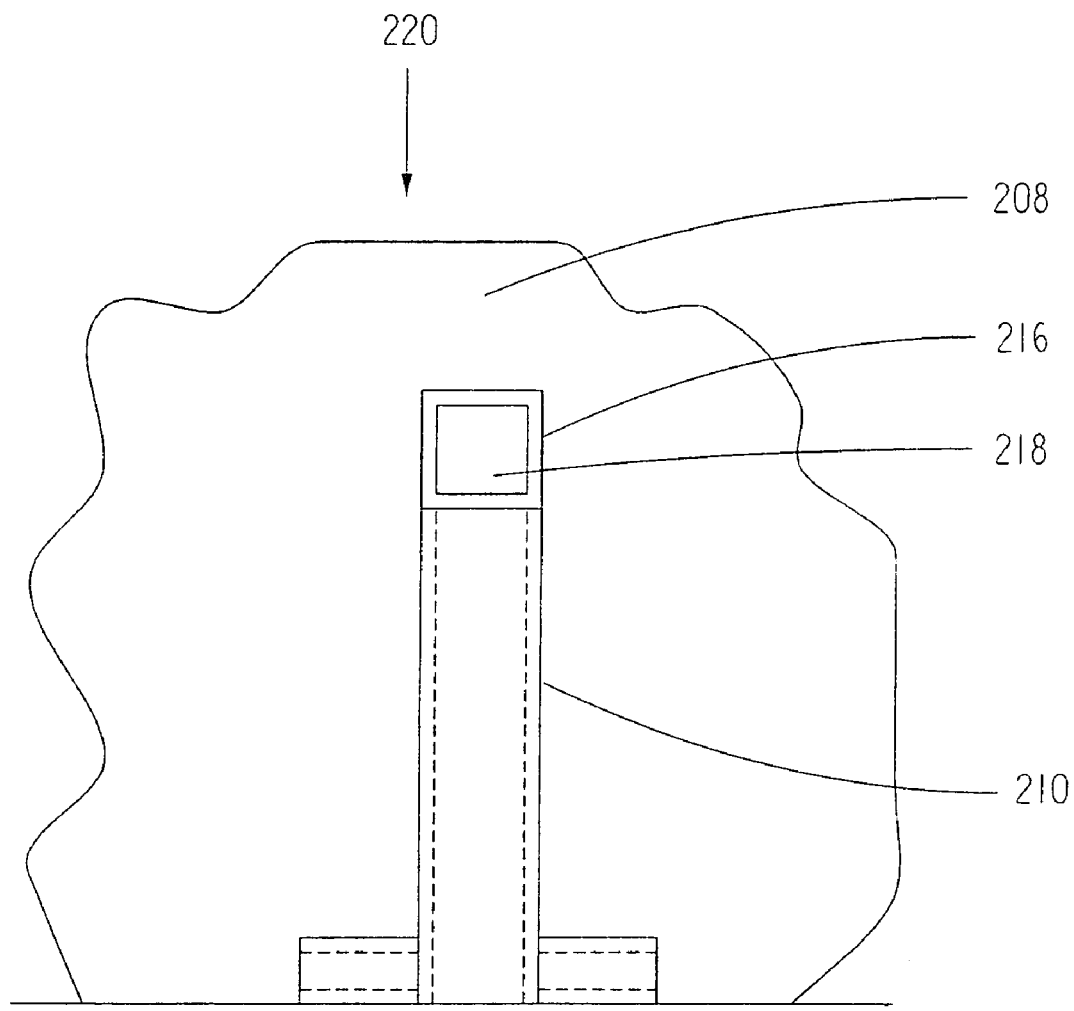
FIG. 18 is a side view taken along line 18—18 of FIG. 17.

FIGS. 16, 17 and 18 show another embodiment of the condensate removal system of the present invention designated with reference number 200. The condensate removal system 200 is formed integrally with the housing 220 of the drive mechanism. The condensate removal system 200 includes a generally U-shaped conduit 202 having a collection leg 204 formed between a first wall 206 and a second wall 208 of the housing 220. The condensate removal system 200 includes a discharge leg 210 formed in part by the exterior surface of the second wall 208. The discharge leg 210 is in fluid communication with the collection leg 204. The discharge leg 210 includes a first end 212 in fluid communication with collection leg 204 and a second end 214 having a spout 216 and an outlet port 218. The discharge leg 210 may include a reduced cross-sectional area segment at the second end 214, a seal member and seat, or an upper segment that is slideable with respect to a lower segment of discharge leg 210, or any combination thereof, if desired.

It should be noted that if the first fluid 28 has a specific gravity greater than that of water, condensate and infiltrate water will float on the surface of the first fluid 28. In this case, the condensate removal system inlet port in the collection leg is located at or slightly above the top surface 62 of the first fluid 28 to remove only the floating water, thereby preventing the accumulation of water above the first fluid top surface 62.

Various features of the invention have been particularly shown and described in connection with the illustrated embodiments of the invention, however, it must be understood that these particular arrangements merely illustrate, and that the invention is to be given its fullest interpretation within the terms of the attached claims.

What is claimed is:

1. A condensate removal system for removing condensate from a fluid reservoir, said condensate removal system including:
a fluid conduit including a discharge leg having a first end and a second end, said first end adapted to be connected in fluid communication with the fluid reservoir, said second end including an outlet port, said discharge leg including a first segment extending from said first end toward said second end and a second segment located between said second end and said first segment, said first segment including a first bore having a first cross-sectional area and said second segment including a second bore having a second cross-sectional area, said second cross-sectional area being smaller than said first cross sectional area to inhibit evaporation of fluid within said discharge leg through said outlet port.

2. The condensate removal system of claim 1 wherein said second segment of said discharge leg includes said outlet port, said second segment being slidably attached to said first segment such that the position of the outlet port can be selectively adjusted.

3. The condensate removal system of claim 1 wherein said second segment of said discharge leg includes a seal mechanism, said seal mechanism including a seat and a seal member, said seal member adapted to engage said seat and create a seal therewith to inhibit evaporation of fluid within said discharge leg through said outlet port, said seal member adapted to disengage from said seat to allow fluid within said discharge leg to flow through said outlet port.

4. The condensate removal system of claim 3 wherein said seat is generally annular and said seal member is generally spherical.

5. The condensate removal system of claim 3 wherein said seal member comprises a flap pivotally attached to said discharge leg.

6. The condensate removal system of claim 1 wherein said second end of said discharge leg includes a spout, said spout including said outlet port.

7. The condensate removal system of claim 1 wherein said fluid conduit includes a collection leg, said collection leg including a first end adapted to be connected in fluid communication with the fluid reservoir and a second end adapted to be connected in fluid communication with said first end of said discharge leg.

8. A condensate removal system for removing condensate from a fluid reservoir containing a primary fluid, said condensate removal system including:
a fluid conduit adapted to be connected in fluid communication with the fluid reservoir, said fluid conduit adapted to receive primary fluid and condensate from the fluid reservoir, said fluid conduit including a discharge leg having a first end, a second end and a seal mechanism, said first end adapted to be connected in fluid communication with the fluid reservoir, said second end including an outlet port, said seal mechanism including a seat and a seal member, said seal member adapted to engage said seat to create a seal therewith to inhibit evaporation of condensate within said discharge leg through said outlet port, said seal member adapted to disengage from said seat to allow condensate within said discharge leg to flow through said outlet port to maintain a substantially constant level of primary fluid in the fluid reservoir.

9. The condensate removal system of claim 8 wherein said seat is generally annular and said seal member is generally spherical.

10. The condensate removal system of claim 8 wherein said seal member comprises a flap pivotally attached to said discharge leg.

11. The condensate removal system of claim 8 wherein said outlet port is in fluid communication with the atmosphere.

12. A condensate removal system for removing condensate from a fluid reservoir, said condensate removal system including:
a fluid conduit including a discharge leg having a first end and a second end, said first end adapted to be connected in fluid communication with the fluid reservoir, said second end including an outlet port, said discharge leg including a first segment including said first end and a second segment including said outlet port, said second segment being slidably attached to said first segment such that the position of said outlet port can be selectively adjusted.

13. The condensate removal system of claim 12 wherein said discharge leg includes a seal mechanism, said seal mechanism including a seat and a seal member, said seal member adapted to engage said seat to create a seal therewith to inhibit evaporation of fluid within the discharge leg through said outlet port, said seal member adapted to disengage from said seat to allow fluid within said discharge leg to flow through said outlet port.

14. The condensate removal system of claim 12 including a seal member slidably sealing said second segment to said first segment.

15. The condensate removal system of claim 12 wherein said first segment includes a first bore having a first cross-sectional area and said second segment includes a second bore having a second cross-sectional area, said second cross-sectional area being smaller than said first cross-sectional area.

16. A method of controlling a condensate removal system for removing condensate from a fluid reservoir containing a primary fluid, said method comprising the steps of:

providing a fluid conduit having a discharge leg including a first segment and a second segment, said first segment adapted to be connected in fluid communication with the fluid reservoir, said second segment including an outlet port, said second segment being slidably connected to said first segment;

moving said second segment with respect to said first segment to thereby adjust the elevation of said outlet port to a desired elevation with respect to the fluid reservoir as determined by the specific gravity of the primary fluid.

17. A method of controlling a condensate removal system for removing condensate from a fluid reservoir containing a primary fluid, said method comprising the steps of:

providing a fluid reservoir adapted to contain a primary fluid, and a fluid conduit having a discharge leg including a first end adapted to be connected in fluid communication with the fluid reservoir and a second end including a seat and a seal member adapted to selectively create a seal with said seat, said discharge leg adapted to contain condensate;

sealing said seat of said discharge leg with said seal member to inhibit evaporation of condensate within said discharge leg through said seat; collecting condensate from said fluid reservoir in said fluid conduit; and breaking said seal between said seat of said discharge leg and said seal member to allow condensate within said discharge leg to flow through said seat to maintain a substantially constant level of primary fluid in said reservoir.

18. The method of claim 17 wherein the primary fluid has a first specific gravity and the condensate has a second specific gravity, said second specific gravity being greater than said first specific gravity.

19. A method of controlling a condensate removal system for removing condensate from a fluid reservoir containing a primary fluid, said method comprising the steps of:

providing a fluid conduit having a discharge leg including a bore extending from a first end to a second end of said discharge leg, said first end adapted to be connected in fluid communication with the reservoir, said second end including an outlet port;

decreasing the cross-sectional area of said bore from a first cross-sectional area at said first end of said discharge leg to a second cross-sectional area adjacent said outlet port to inhibit evaporation of fluid with said discharge leg through said outlet port.

* * * * *